(12) United States Patent
Yamamoto et al.

(10) Patent No.: US 8,982,018 B2
(45) Date of Patent: *Mar. 17, 2015

(54) EL DISPLAY PANEL MODULE, EL DISPLAY PANEL, INTEGRATED CIRCUIT DEVICE, ELECTRONIC APPARATUS AND DRIVING CONTROLLING METHOD

(71) Applicant: Sony Corporation, Tokyo (JP)

(72) Inventors: Tetsuro Yamamoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 13/739,270

(22) Filed: Jan. 11, 2013

(65) Prior Publication Data

US 2013/0127370 A1      May 23, 2013

Related U.S. Application Data

(63) Continuation of application No. 12/379,017, filed on Feb. 11, 2009, now Pat. No. 8,384,626.

(30) Foreign Application Priority Data

Feb. 28, 2008   (JP) .................................. 2008-047079

(51) Int. Cl.
*G09G 3/30*        (2006.01)
*H05B 33/08*       (2006.01)
*G09G 3/32*        (2006.01)

(52) U.S. Cl.
CPC .............. *H05B 33/08* (2013.01); *G09G 3/3233* (2013.01); *G09G 3/3266* (2013.01);

(Continued)

(58) Field of Classification Search
USPC ....................................................... 345/76, 77
See application file for complete search history.

(56) References Cited

U.S. PATENT DOCUMENTS 7,057,588 B2    6/2006  Asano et al.
7,102,202 B2    9/2006  Kobayashi et al.
(Continued)

FOREIGN PATENT DOCUMENTS

JP    2003-255856 A    9/2003
JP    2003-271095 A    9/2003
(Continued)

OTHER PUBLICATIONS

Japanese Office Action issued May 22, 2012 for corresponding Japanese Application No. 2008-047079.

*Primary Examiner* — Temesgh Ghebretinsae
*Assistant Examiner* — Benyam Ketema
(74) *Attorney, Agent, or Firm* — Rader, Fishman & Grauer PLLC

(57) ABSTRACT

An EL display panel includes light emitting pixels disposed in a matrix and a driving circuit for driving the pixels. The driving circuit drives the pixels such that a threshold value correction operation is carried out commonly (simultaneously) for a group of multiple pixels, which are connected to a same signal line, and such that an operation of writing a signal potential corresponding to a gradation value is executed individually (time-sequentially) for the pixels in the group. The driving circuit applies a reset potential to the pixels in the group before executing the signal writing operation. The reset potential is lower than a reference potential that is used for the threshold value correction operation.

9 Claims, 34 Drawing Sheets

(52) U.S. Cl.
CPC ............... *G09G 2300/0819* (2013.01); *G09G 2300/0842* (2013.01); *G09G 2300/0866* (2013.01); *G09G 2310/0235* (2013.01); *G09G 2310/0256* (2013.01); *G09G 2320/043* (2013.01); *G09G 2320/045* (2013.01)
USPC ............................... 345/76; 345/77; 315/294

(56) References Cited

U.S. PATENT DOCUMENTS

| | | | |
|---|---|---|---|
| 7,109,952 | B2 | 9/2006 | Kwon |
| 7,429,985 | B2 | 9/2008 | Kimura et al. |
| 8,072,399 | B2 * | 12/2011 | Iida et al. ..................... 345/77 |
| 8,098,241 | B2 | 1/2012 | Toyomura et al. |
| 8,432,345 | B2 * | 4/2013 | Asano ........................ 345/92 |
| 2004/0174349 | A1 * | 9/2004 | Libsch et al. ................. 345/204 |
| 2005/0206590 | A1 | 9/2005 | Sasaki et al. |
| 2008/0030436 | A1 * | 2/2008 | Iida et al. ..................... 345/77 |
| 2008/0030446 | A1 | 2/2008 | Asano |
| 2008/0049007 | A1 * | 2/2008 | Iida et al. ..................... 345/211 |
| 2008/0143264 | A1 * | 6/2008 | Minami et al. ............. 315/169.3 |
| 2008/0198103 | A1 * | 8/2008 | Toyomura et al. ............. 345/77 |
| 2010/0045646 | A1 | 2/2010 | Kishi |

FOREIGN PATENT DOCUMENTS

| | | |
|---|---|---|
| JP | 2004-029791 A | 1/2004 |
| JP | 2004-093682 A | 3/2004 |
| JP | 2004-133240 A | 4/2004 |
| JP | 2006-084682 A | 3/2006 |
| JP | 2006-227238 A | 8/2006 |
| JP | 2006-276099 A | 10/2006 |
| JP | 2007-140318 A | 6/2007 |
| JP | 2007-310034 A | 11/2007 |
| JP | 2008-033194 A | 2/2008 |
| JP | 2008-039946 A | 2/2008 |
| JP | 2008-233651 A | 10/2008 |

* cited by examiner

EL DISPLAY PANEL MODULE, EL DISPLAY PANEL, INTEGRATED CIRCUIT DEVICE, ELECTRONIC APPARATUS AND DRIVING CONTROLLING METHOD

CROSS REFERENCES TO RELATED APPLICATIONS

This is a Continuation application of U.S. patent application Ser. No. 12/379,017 filed Feb. 11, 2009, now U.S. Pat. No. 8,384,626, which in turn claims priority from Japanese Application No.: 2008-047079 filed in the Japan Patent Office on Feb. 28, 2008, the entire contents of which being incorporated herein by reference.

BACKGROUND OF THE INVENTION

1. Field of the Invention

This invention relates to a technique for optimizing the fabrication cost and the display image quality of an EL (electro luminescence) display panel which is driven and controlled by an active matrix driving method, and more particularly to an EL display panel module, an EL display panel, an integrated circuit device, an electronic apparatus and a driving controlling method.

2. Description of the Related Art

A circuit block configuration popular to an organic EL panel module of the active matrix driven type is shown in FIG. 1. Referring to FIG. 1, the organic EL panel module 1 shown includes a pixel array section 3, and a write scan driver 5, a power supply scan driver 7 and a horizontal selector 9 which are driving circuits for the pixel array section 3.

Incidentally, an organic EL element is a current light emitting element. Therefore, the organic EL panel module adopts a driving method wherein the amount of current to flow through the organic EL element is controlled for control of the gradation of light to be emitted from each pixel. FIG. 2 shows one of comparatively simple circuit configurations for a pixel circuit of the type described. Referring to FIG. 2, the pixel circuit shown includes a scan transistor T1, a driving transistor T2 and a storage capacitor Cs.

The scan transistor T1 is used to write a signal voltage corresponding to a gradation of the corresponding pixel into the storage capacitor Cs. The driving transistor T2 is used to supply current Ids based on a gate-source voltage Vgs, which depends upon the storage voltage of the storage capacitor Cs, to an organic EL element OLED.

Incidentally, where the driving transistor T2 is formed from a p-channel type thin film transistor, it is connected at the source electrode thereof to a power supply line. In other words, the driving transistor T2 is designed so as to normally operate in a saturation region thereof. Accordingly, the driving transistor T2 operates as a constant current source. Thereupon, the current Ids is given by the following expression:

$$Ids = k \cdot \mu \cdot (Vgs - Vth)^2 / 2$$

where $\mu$ is the mobility of the majority carrier of the driving transistor T2 and Vth the threshold voltage of the driving transistor T2, and k is a coefficient given by $(W/L) \cdot Cox$. Here, W is the channel width, L the channel length, and Cox the gate capacitance per unit area.

It is to be noted that, in the configuration of the pixel circuit described, the drain voltage of the driving transistor T2 varies together with the aged deterioration of the I-V characteristic of an organic EL element illustrated in FIG. 3. However, since the gate-source voltage Vgs is kept fixed, the amount of current supplied to the organic EL element does not vary, and the luminance of emitted light is kept fixed.

An organic EL display panel which adopts the active matrix driving method is disclosed, for example, in Japanese Patent Laid-Open Nos. 2003-255856, 2003-271095, 2004-133240, 2004-029791 and 2004-093682.

SUMMARY OF THE INVENTION

Incidentally, if the driving transistor T2 is replaced by an n-channel type thin film transistor, then it is connected now at the source potential thereof to the organic EL element as seen in FIG. 4. In the case of the present pixel circuit, the amount of current varies together with the aged deterioration of the I-V characteristic of the organic EL element, and the luminance of emitted light varies.

Further, since the threshold value and the mobility of the driving transistor T2 vary among different pixels, a dispersion appears in the current value in accordance with the expression given hereinabove, and also the luminance of emitted light varies for each pixel.

Therefore, it is demanded to establish a pixel circuit and a driving method by which a stabilized light emission characteristic is obtained regardless of the aged deterioration even where the driving transistor T2 is formed from an n-channel thin film transistor. Simultaneously, it is demanded to further decrease the fabrication cost in order to popularize the organic EL panel module.

According to an embodiment of the present invention, there is provided an EL display panel module including a pixel array section including a panel serving as a substrate and a plurality of pixels disposed in a matrix on the panel and each including a pixel circuit and a light emitting region, and a driving circuit for driving the pixel circuits such that a threshold value correction operation is carried out commonly for plural ones of the pixel circuits which are connected to each signal line and writing of a signal potential corresponding to a gradation value is executed time-sequentially for the individual pixel circuits, the driving circuit applying a reset potential lower than a reference potential for the threshold value correction to the plural ones of the pixel circuits which are connected to each signal line before first writing of the signal potential after the threshold value correction operation is completed, the pixel array section and the driving circuit being mounted on the same substrate.

According to another embodiment of the present invention, there is provided an EL display panel including a pixel array section including a panel serving as a substrate and a plurality of pixels disposed in a matrix on the panel and each including a pixel circuit and a light emitting region, and a driving circuit for driving the pixel circuits such that a threshold value correction operation is carried out commonly for plural ones of the pixel circuits which are connected to each signal line and writing of a signal potential corresponding to a gradation value is executed time-sequentially for the individual pixel circuits, the driving circuit applying a reset potential lower than a reference potential for the threshold value correction to the plural ones of the pixel circuits which are connected to each signal line before first writing of the signal potential after the threshold value correction operation is completed, the pixel array section and the driving circuit being formed on the same substrate.

With the EL display panel module and the EL display panel, both of reduction of the cost and assurance of high picture quality can be achieved.

The above and other features and advantages of the present invention will become apparent from the following descrip-

DETAILED DESCRIPTION OF THE PREFERRED EMBODIMENTS

In the following, the present invention is described in detail in connection with an organic EL panel module or an EL display panel of the active matrix driven type to which embodiments of the present invention is applied.

It is to be noted that, for technical matters which are not specifically described herein or specifically illustrated in the accompanying drawings, techniques which are known in the pertaining technical field are applied.

A. Appearance Configuration

In the present specification, an apparatus wherein driving circuits fabricated, for example, as ICs (integrated circuits) for a particular application are mounted on a board on which a pixel array section is formed is referred to as organic EL panel module, and an apparatus wherein a pixel array section and driving circuits are formed on the same substrate using the same process is referred to as organic EL panel.

Figure 1:
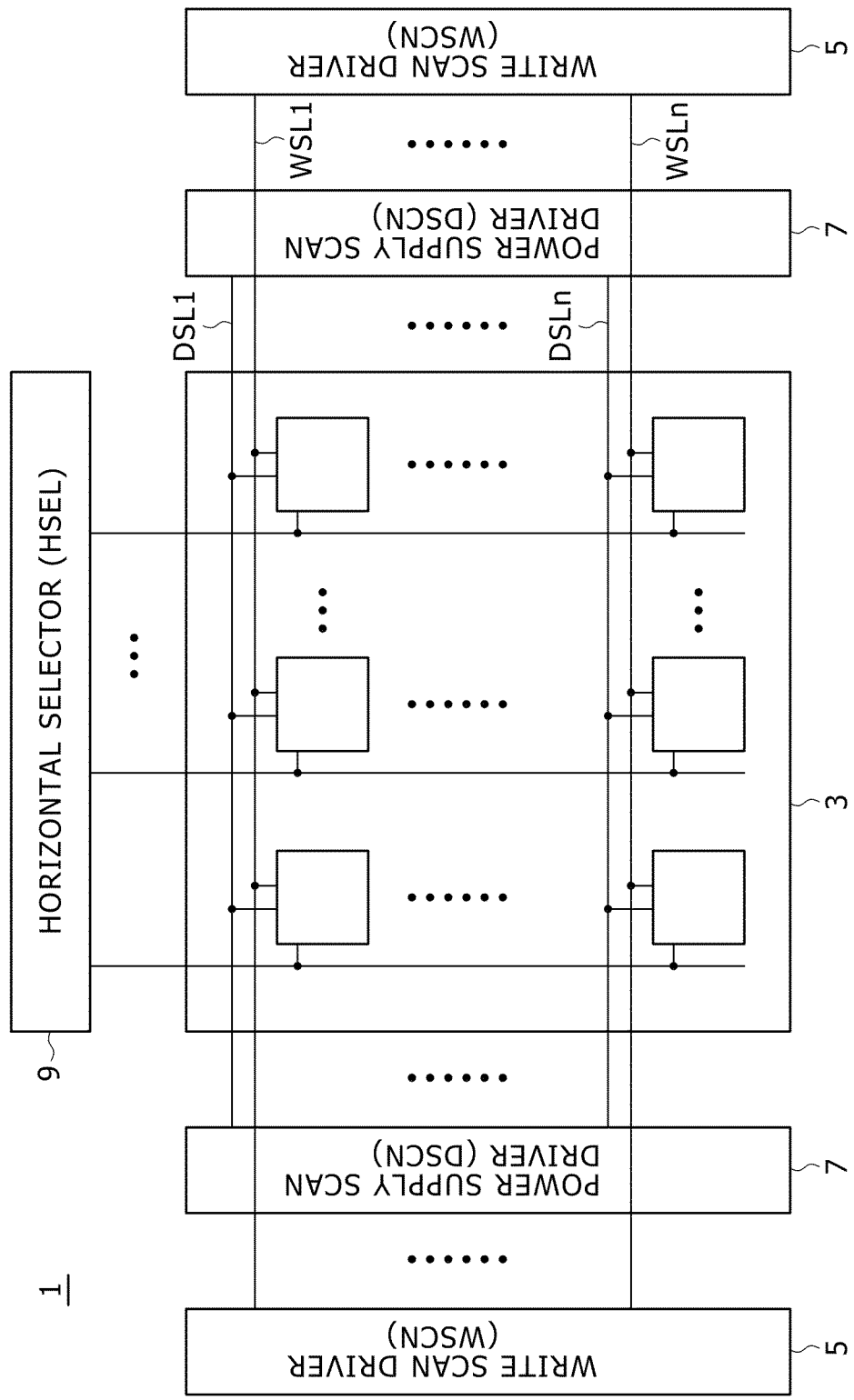
FIG. 1 is a block diagram showing a circuit block configuration of an organic EL panel module.
Figure 2:
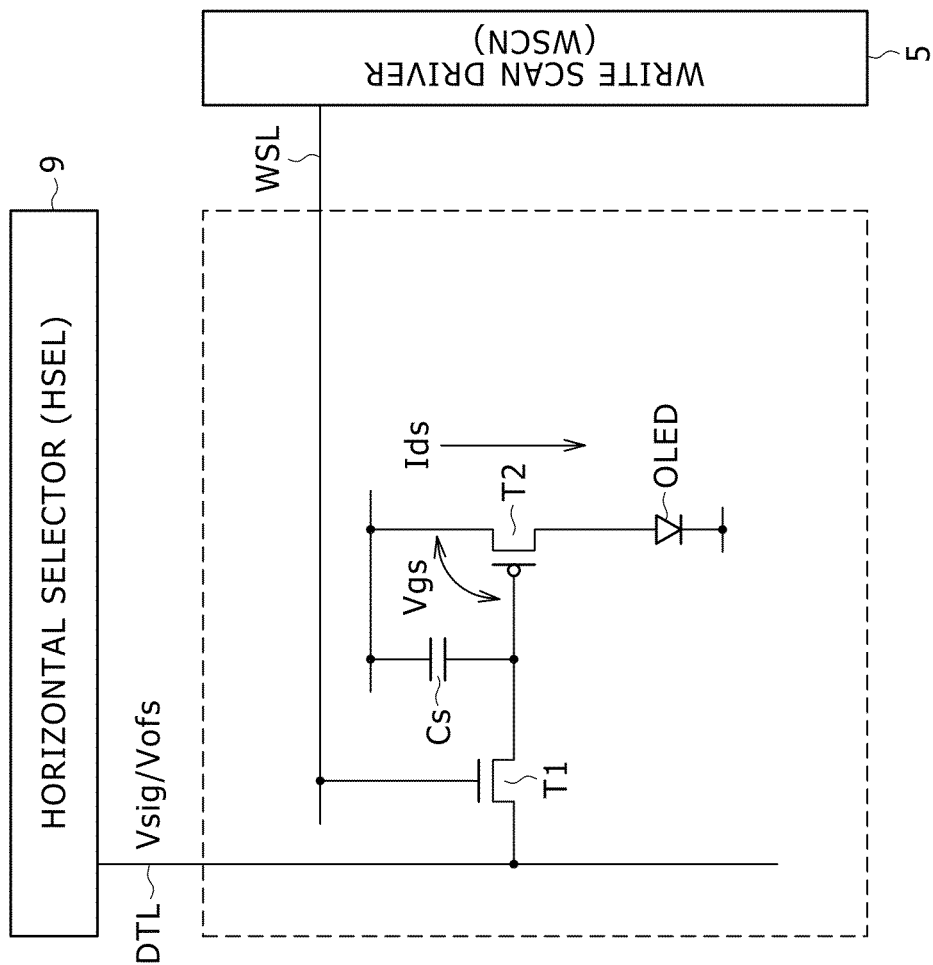
FIG. 2 is a circuit diagram showing an example of a pixel circuit.
Figure 3:
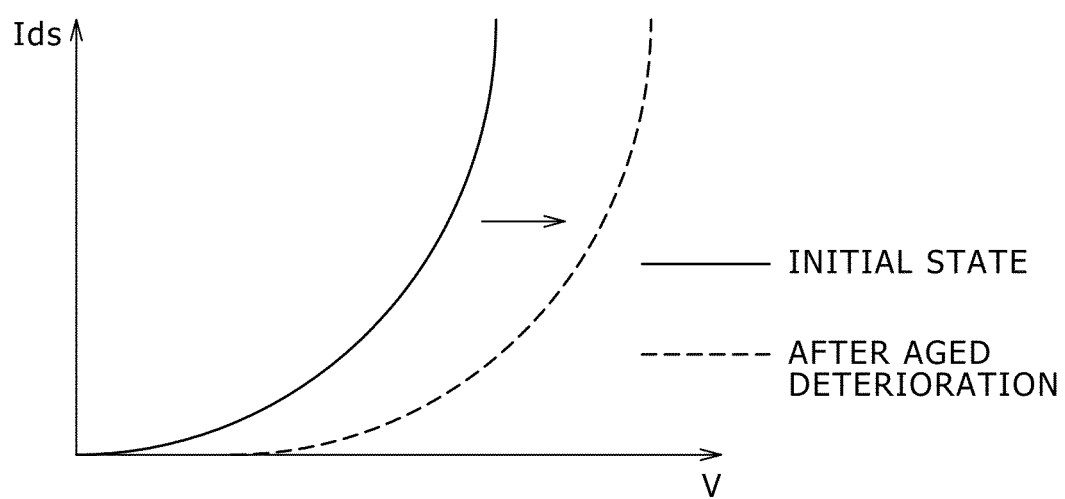
FIG. 3 is a diagram illustrating aged deterioration of the I-V characteristic of an organic EL element.
Figure 4:
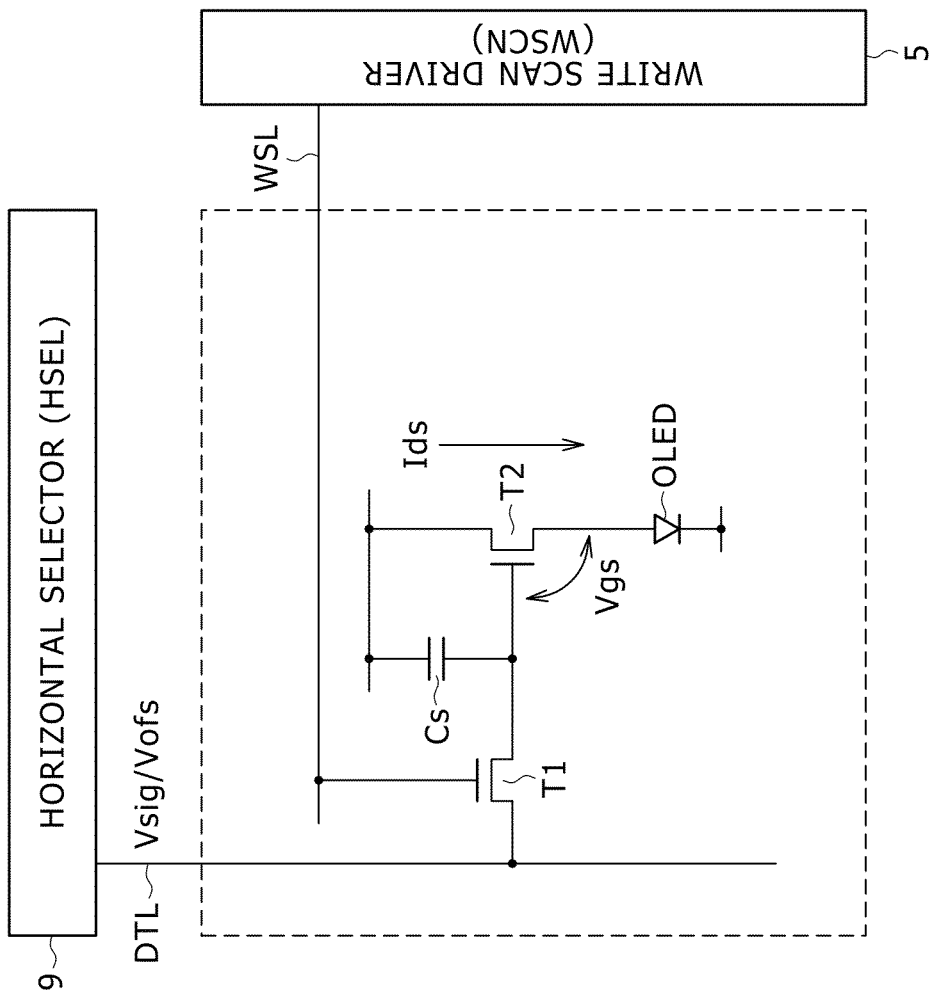
FIG. 4 is a circuit diagram showing an another example of a pixel circuit.
Figure 5:
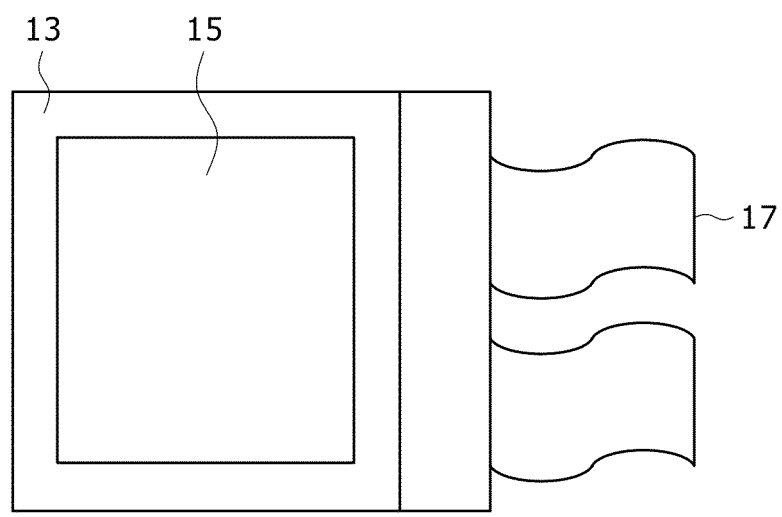
FIG. 5 is a schematic view showing an example of an appearance configuration of an organic EL panel module to which an embodiment of the present invention is applied.

In the following, the organic EL panel module is described. FIG. 5 shows an example of an appearance configuration of an organic EL panel module 11. Referring to FIG. 5, the organic EL panel module 11 shown is structured such that an opposing section 15 is adhered to a region of a support substrate 13 in which a pixel array section is formed.

The opposing section 15 includes a substrate made of glass or some other transparent material and a color filter, a protective film and so forth disposed on the surface of the substrate. Further, flexible printed circuits (FPC) 17 for inputting and outputting signals and so forth from and to the support substrate 13 are disposed on the organic EL panel module 11.

B. Embodiment 1

B-1. System Configuration

Figure 6:
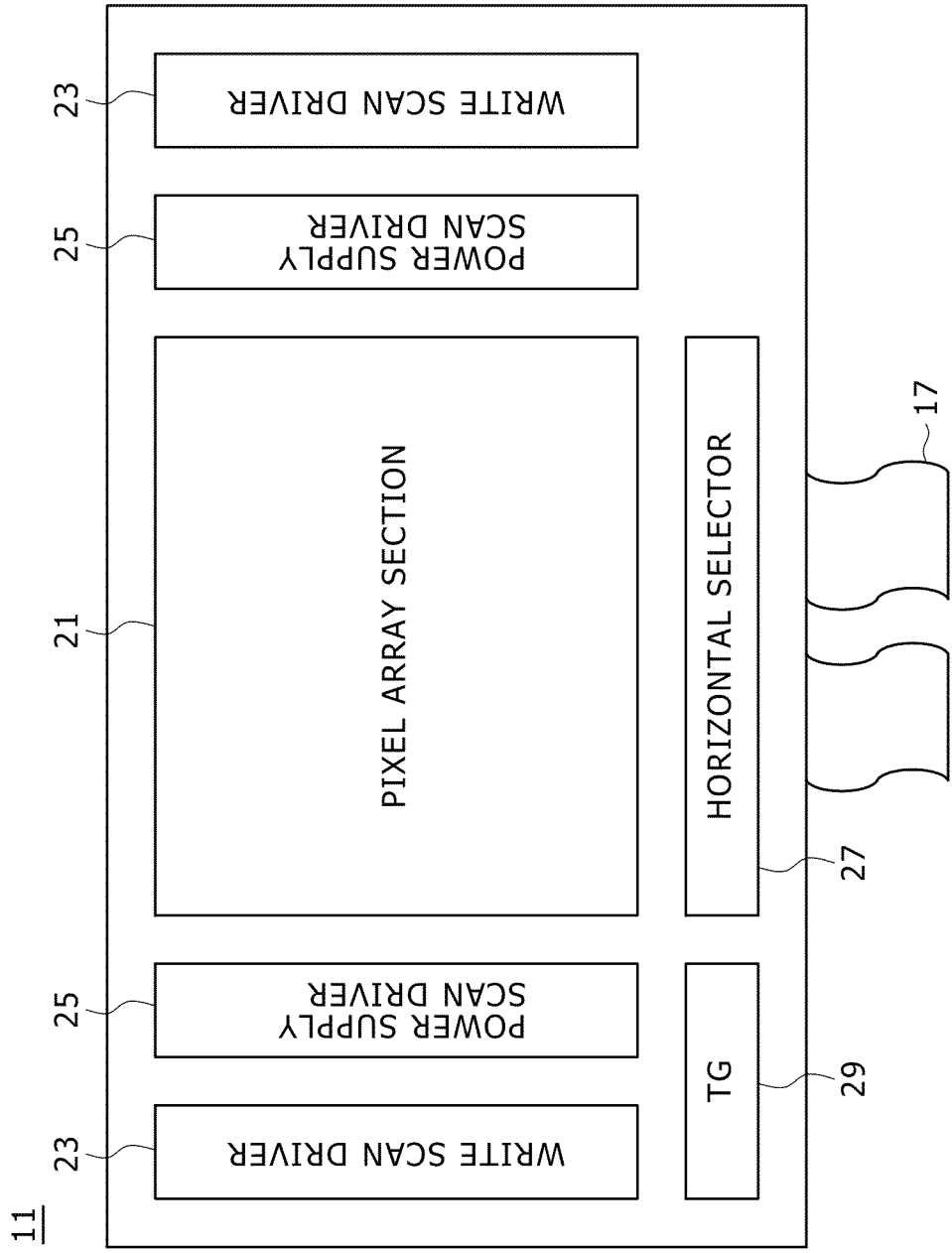
FIG. 6 is a block diagram showing an example of a system configuration of an organic EL panel module according to an embodiment 1 of the present invention.

FIG. 6 shows a general system configuration of the organic EL panel module 11 according to an embodiment 1 of the present invention. Referring to FIG. 6, the organic EL panel module 11 includes a pixel array section 21, and a pair of write scan drivers 23, a pair of power supply scan drivers 25, a horizontal selector 27 and a timing generator (TG) 29 which serve as driving circuits for the pixel array section 21.

The pixel array section 21 includes a large number of sub pixels formed from an organic EL element and a pixel circuit and arranged in a matrix. Incidentally, a sub pixel is a minimum unit of a pixel structure which forms one pixel, and one pixel is composed of three sub pixels (R, G, B) of different organic EL materials.

Figure 7:
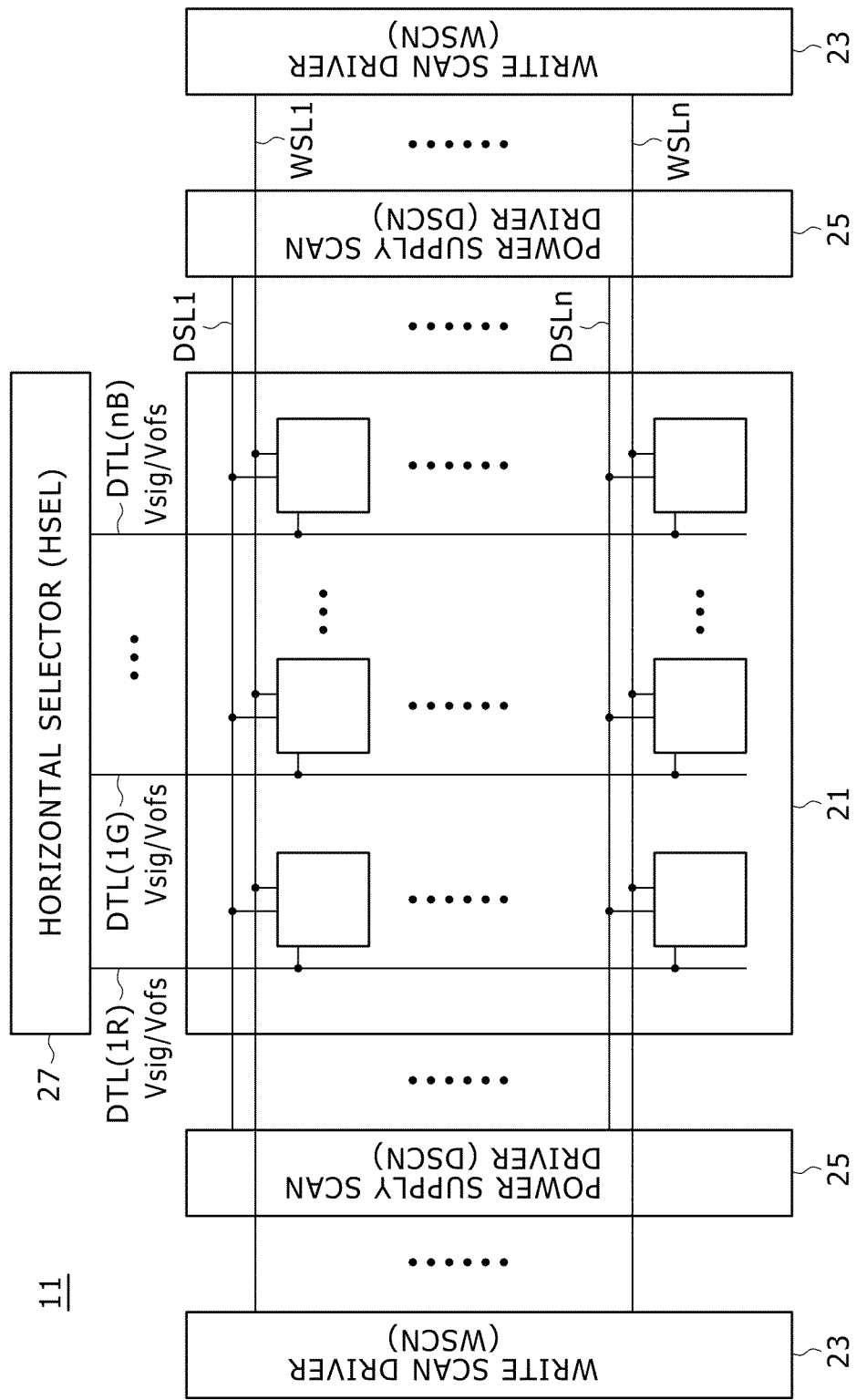
FIG. 7 is a block diagram illustrating a connection relationship between pixel circuits and driving circuits of the organic EL panel module of FIG. 6.
Figure 8:
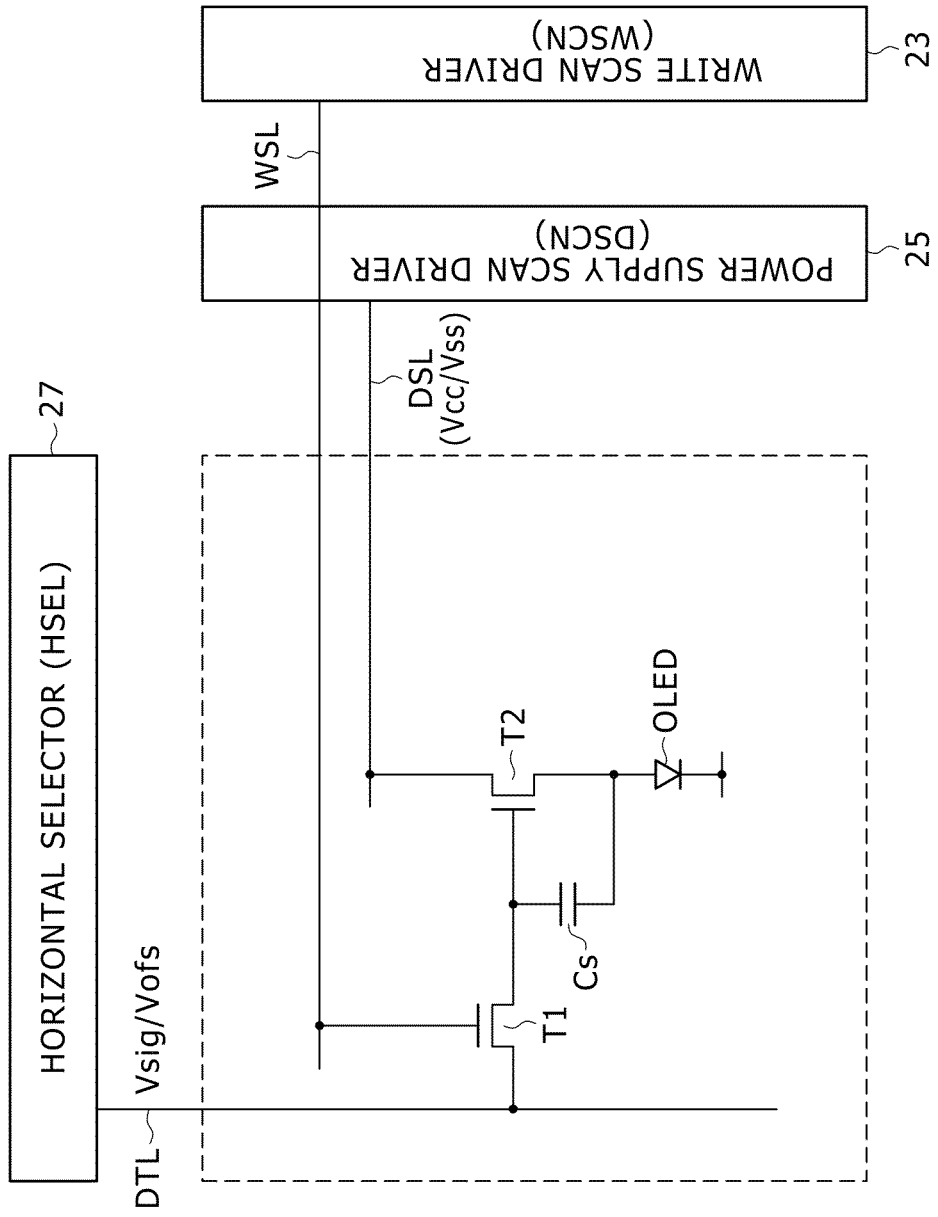
FIG. 8 is a block circuit diagram of a form of a pixel circuit used in the organic EL panel module of FIG. 6.
Figure 9:
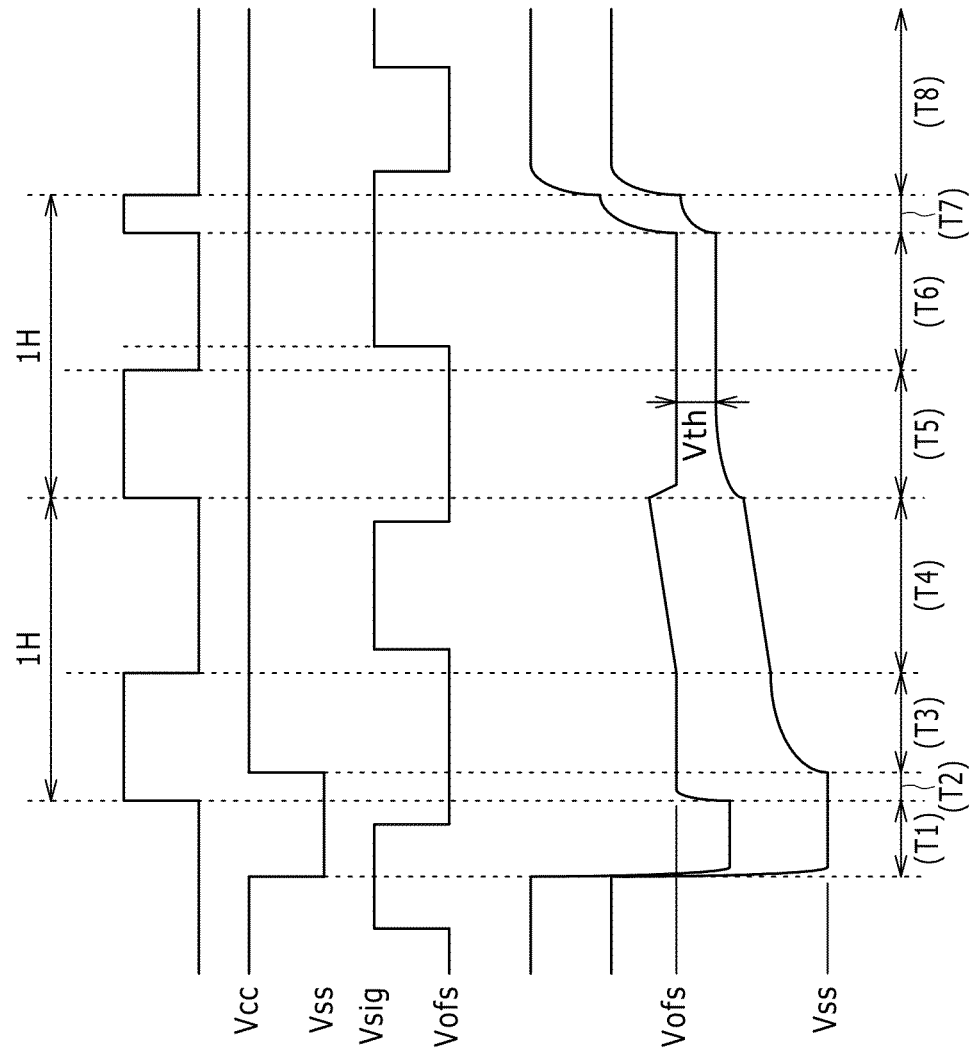
FIGS. 9A to 9E are timing charts illustrating an example of driving operation for the pixel circuit of FIG. 8.

FIG. 7 illustrates a connection relationship between a pixel circuit corresponding to a sub pixel and the driving circuits. FIG. 8 shows an internal configuration of a pixel circuit proposed by the present embodiment. Also the pixel circuit shown in FIG. 8 is composed of two thin film transistors T1 and T2 and one storage capacitor Cs.

It is to be noted that the driving transistor T2 in the pixel circuit is an n-channel thin film transistor. Meanwhile, the storage capacitor Cs is connected to the gate electrode of the driving transistor T2 and the anode electrode of an organic EL element OLED.

Also in the circuit configuration described, the write scan drivers 23 control the scan transistor T1 between on and off through a write scan line WSL to control writing of a potential into the storage capacitor Cs. The write scan drivers 23 are formed from a shift register.

The power supply scan drivers 25 control the power supply voltage to be applied to one of main electrodes of the driving transistor T2 in a binary fashion through a feed line DSL to control a correction operation of the characteristic dispersion of the pixel circuit together with the other driving circuits. In particular, the power supply scan drivers 25 compensate for the deterioration of the uniformity arising from a threshold value dispersion or a mobility dispersion of the driving transistor T2.

The horizontal selector 27 is a circuit device for applying a signal potential Vsig corresponding to a gradation value of pixel data or an offset potential Vofs for threshold value correction to a signal line DTL.

The timing generator 29 is a circuit device for producing a driving pulse for the write scan line WSL, feed line DSL and signal line DTL.

B-2. Example of Driving Operation

FIGS. 9A to 9E illustrate an example of driving operation of the pixel circuit shown in FIG. 8. It is to be noted that, while FIGS. 9A to 9E illustrate an example of driving operation where two horizontal scanning periods are utilized to execute threshold value correction, operation from a threshold value correction operation to writing of the signal potential Vsig may be executed within one horizontal scanning period.

Incidentally, in FIGS. 9A to 9E, the higher one of two potentials to be applied to the feed line DSL is represented by Vcc while the lower one of the two potentials is represented by Vss.

Figure 10:
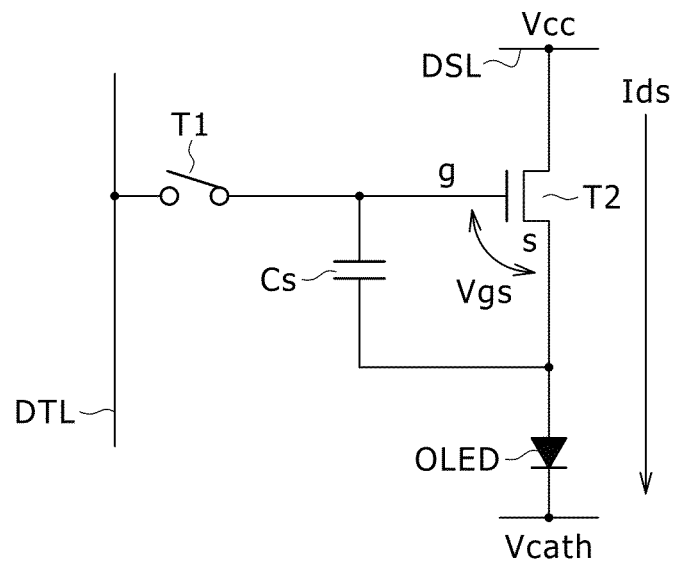
FIGS. 10 to 13 are circuit diagrams illustrating different operation states of the pixel circuit of FIG. 8.

First, an operation state of the pixel circuit in a light emitting state is illustrated in FIG. 10. At this time, the scan transistor T1 is in an off state. On the other hand, the driving transistor T2 operates in a saturation region, and current Ids which depends upon the gate-source voltage Vgs flows through the driving transistor T2.

Now, an operation state in a no-light emitting state is described. First, the potential of the feed line DSL is changed over from the high potential Vcc to the low potential Vss at time T1 illustrated in FIGS. 9A to 9G. In this instance, if the low potential Vss is lower than the sum of a threshold value Vthel and a cathode potential Vcath, that is, if Vss<Vthel+Vcath, then the organic EL element OLED emits no light.

Figure 11:
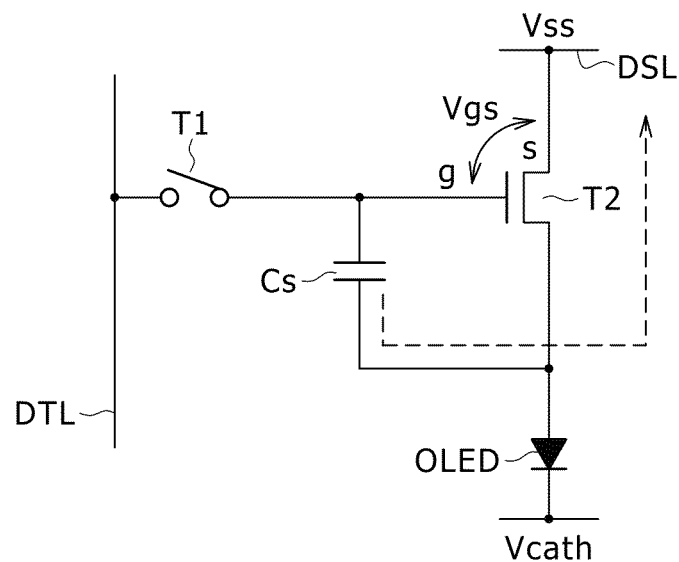

It is to be noted that the source potential Vs of the driving transistor T2 is equal to the potential of the feed line DSL. In other words, the anode potential of the organic EL element OLED is charged to the low potential Vss. An operation state of the pixel circuit in this instance is illustrated in FIG. 11.

Thereafter, if the potential of the write scan line WSL changes to the high potential in a state wherein the potential of the signal line DTL is the offset potential Vofs for threshold value correction, then the gate potential Vg of the driving transistor T2 changes to the offset potential Vofs through the scan transistor T1 in an on state at time T2 illustrated in FIG. 9A to 9G.

Figure 12:
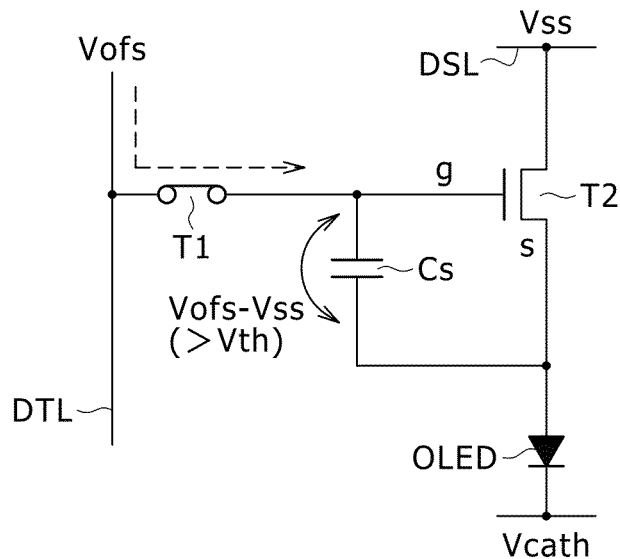

FIG. 12 illustrates the operation state of the pixel circuit in this instance. Thereupon, the gate-source voltage Vgs of the driving transistor T2 is given by Vofs−Vss. This voltage is set so as to be higher than the threshold voltage Vth of the driving transistor T2. This is because the threshold value correction operation cannot be executed if Vofs−Vss>Vth is not satisfied.

Then, the potential of the feed line DSL is changed back to the high potential Vcc at time T3 illustrated in FIGS. 9A to 9G. Since the voltage of the feed line DSL changes to the high potential Vcc, the anode potential of the organic EL element OLED becomes the source potential Vs of the driving transistor T2.

Figure 13:
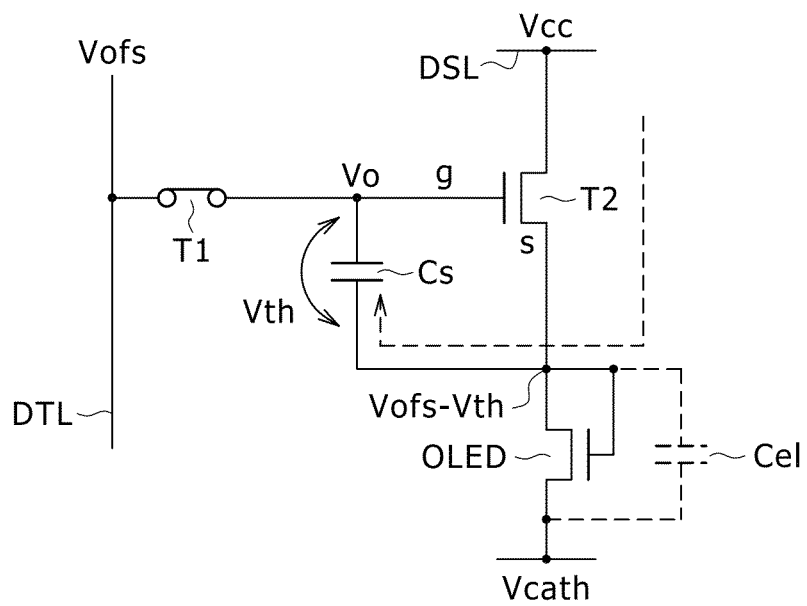

FIG. 13 represents the organic EL element OLED in an equivalent circuit. Referring to FIG. 13, the organic EL element OLED is represented by a diode and a parasitic capacitance Cel. At this time, as far as the relationship of Vel<Vcath+Vthel is satisfied, the current Ids flowing to the driving transistor T2 is used to charge the storage capacitor Cs and the parasitic capacitance Cel. In this instance, it is assumed that the leak current of the organic EL element is considerably lower than the current Ids flowing through the driving transistor T2.

Figure 14:
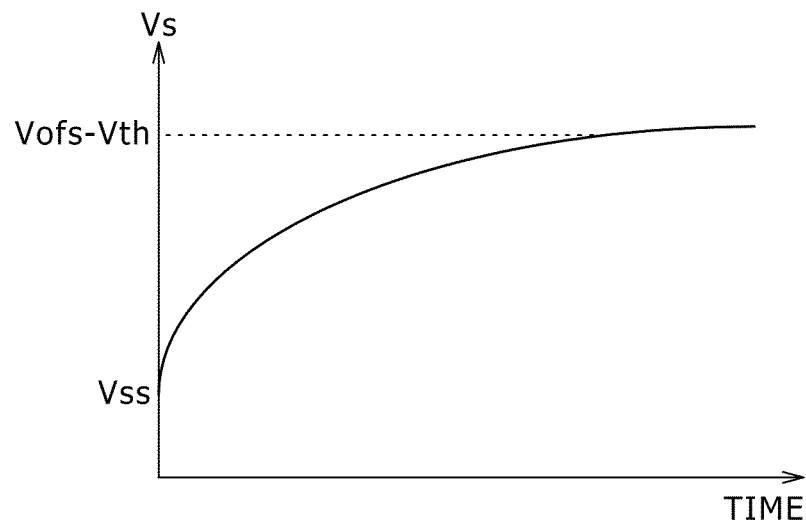
FIG. 14 is a diagram illustrating aged deterioration of the source potential of a transistor.

As a result, the anode voltage Vel of the organic EL element OLED rises as time passes as shown in FIG. 14. This period is a threshold value correction period.

After a fixed period of time passes after the threshold value correction period is started, the scan transistor T1 is controlled to an off state at time T4 illustrated in FIGS. 9A to 9G. In other words, the threshold value correction operation temporarily stops. At this time, the gate-source voltage Vgs of the driving transistor T2 is higher than the threshold voltage Vth.

Figure 15:
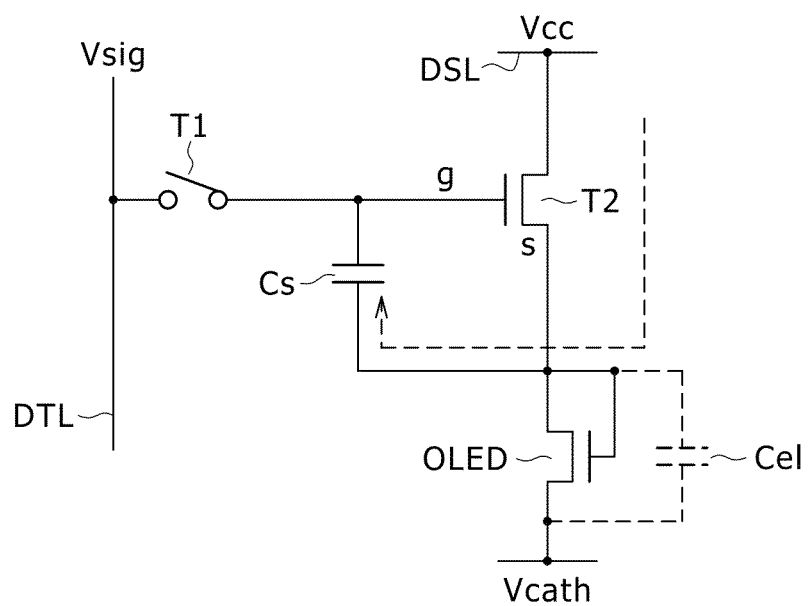
FIGS. 15 and 16 are circuit diagrams illustrating different operation states of the pixel circuit of FIG. 8.

Accordingly, the current Ids flows and both of the gate potential Vg and the source potential Vs of the driving transistor T2 rise together as seen in FIG. 15. It is to be noted that, also within this period, since a reverse bias is applied to the organic EL element OLED, the organic EL element OLED does not emit light.

Soon, the threshold value correction period is resumed. In particular, the potential of the signal line DTL becomes the offset potential Vofs and the scan transistor T1 is controlled to an on state simultaneously at time T5 illustrated in FIGS. 9A to 9G.

Finally, the gate-source voltage Vgs of the driving transistor T2 converges to the threshold voltage Vth. At this time, Vel=Vofs−Vth<Vcath+Vthel is satisfied.

When the threshold value correction period ends, the scan transistor T1 is controlled to an off state at time T6 illustrated in FIGS. 9A to 9G.

Figure 16:
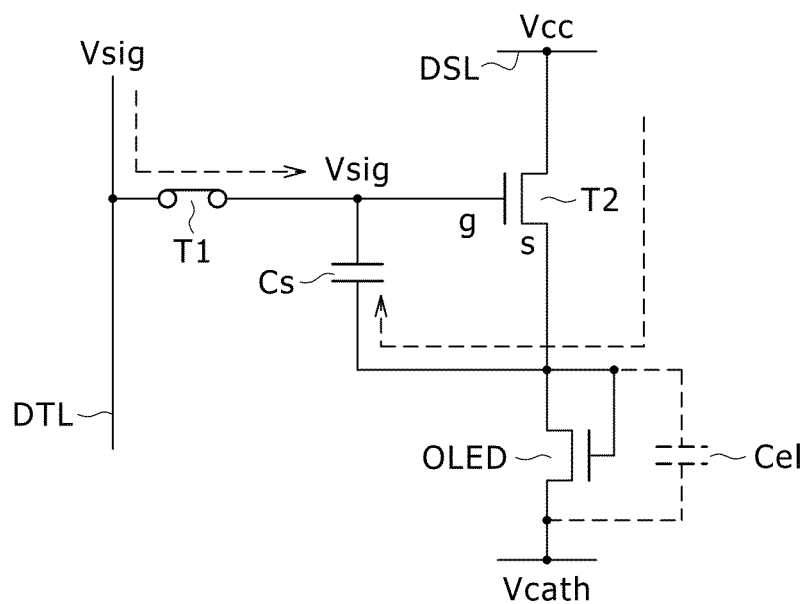

Thereafter, at a point of time when the potential of the signal line DTL becomes the signal potential Vsig, the scan transistor T1 is controlled back to an on state at time T7 illustrated in FIGS. 9A to 9G. FIG. 16 illustrates an operation state of the pixel circuit in this instance. Incidentally, the signal potential Vsig is fixed depending on the gradation. Thereupon, although the gate potential Vg of the driving transistor T2 becomes the signal potential Vsig, since current from the feed line DSL flows into the storage capacitor Cs, the source potential Vs rises as time passes.

At this time, if the source potential Vs of the driving transistor T2 does not exceed the sum of the threshold value Vthel and the cathode potential Vcath of the organic EL element OLED, that is, if the leak current of the organic EL element OLED is considerably lower than the current flowing through the driving transistor T2, then the current Ids of the driving transistor T2 is used to charge the storage capacitor Cs and the parasitic capacitance Cel.

Figure 17:
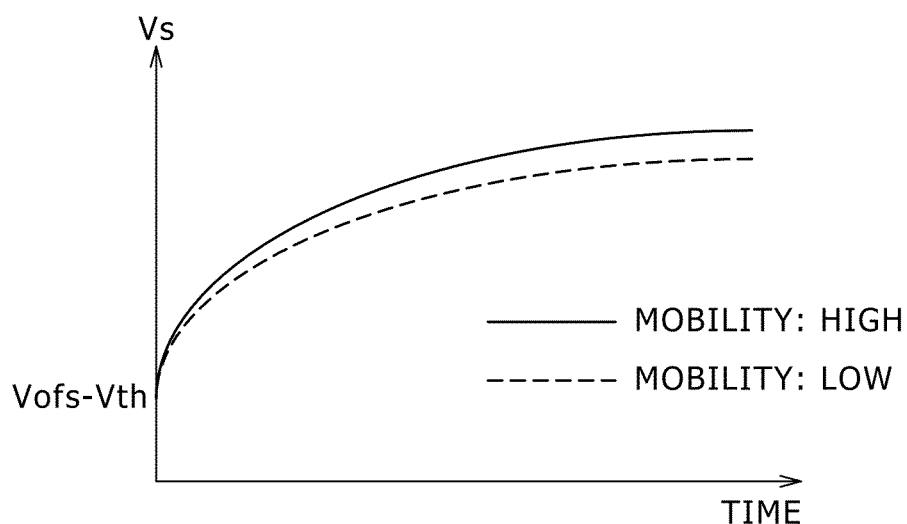
FIG. 17 is a diagram illustrating a difference in aged deterioration of a transistor arising from a difference in mobility.

It is to be noted that, since the threshold value correction operation of the driving transistor T2 is completed already, the current Ids supplied by the driving transistor T2 has a value which represents the mobility p. In particular, as the driving transistor has a higher mobility p, the current amount increases and the source potential Vs rises more quickly. On the contrary, as the driving transistor has a lower mobility p, the current amount decreases and the rise of the source potential Vs becomes slower as seen from FIG. 17.

Consequently, the gate-source voltage Vgs of the driving transistor T2 decreases reflecting the mobility μ. As a result, at a point of time when a fixed period of time elapses, the gate-source voltage Vgs of the driving transistor T2 converges to a voltage corrected with the mobility μ.

Figure 18:
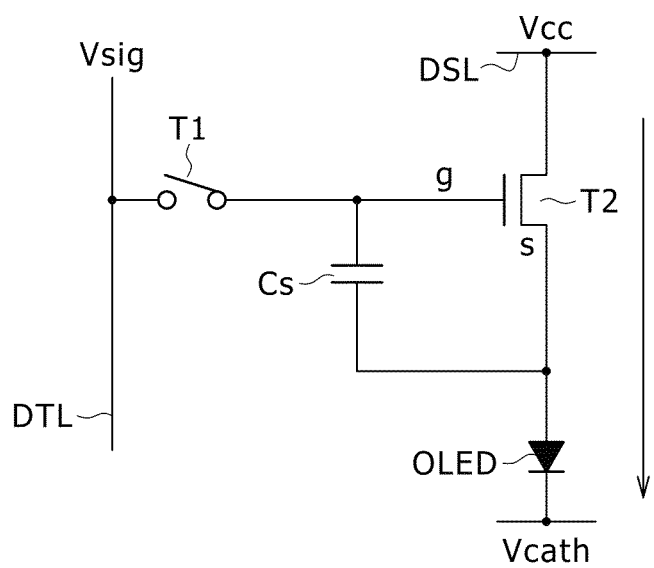
FIG. 18 is a circuit diagram illustrating an operation state of the pixel circuit of FIG. 8.

Finally, when the scan transistor T1 is controlled to an off state and the writing of the signal potential ends, a light emitting period of the organic EL element OLED is started at time T8 illustrated in FIGS. 9A to 9G. FIG. 18 illustrates an operation state of the pixel circuit in this instance. It is to be noted that the gate-source voltage Vgs of the driving transistor T2 is fixed. Accordingly, the driving transistor T2 supplies fixed current Ids' to the organic EL element OLED.

Together with this, the anode voltage Vel of the organic EL element OLED rises to a potential Vx at which the current Ids' is supplied to the organic EL element OLED. Consequently, light emission by the organic EL element OLED is started.

It is to be noted that, also in the case of the driving circuit proposed by the present embodiment, as the light emission time becomes longer, the I-V characteristics thereof varies. Therefore, also the source potential Vs of the driving transistor T2 varies. However, since the gate-source voltage Vgs of the driving transistor T2 is kept fixed by the storage capacitor Cs, the amount of current flowing through the organic EL element OLED does not vary. In this manner, even if the I-V characteristic of the organic EL element OLED is deteriorated, the fixed current Ids normally continues to flow, and the luminance of the organic EL element OLED does not vary.

B-3. Summary

If the pixel circuit of the configuration according to the present embodiment described above is adopted, then also where the driving transistor T2 is formed from a thin film transistor of the n channel type, an organic EL panel module wherein the luminance does not disperse among individual pixels can be implemented.

C. Embodiment 2

Here, an organic EL panel module suitable for further achievement of higher definition and higher speed driving according to an embodiment of the present invention is described. To this end, in the present embodiment, a threshold value correction operation is carried out commonly in a unit of a plurality of horizontal lines. It is to be noted that writing of a signal potential corresponding to pixels of horizontal lines for which the threshold value correction operation is carried out commonly is executed time-sequentially after a threshold value correction period ends.

C-1. System Configuration

Figure 19:
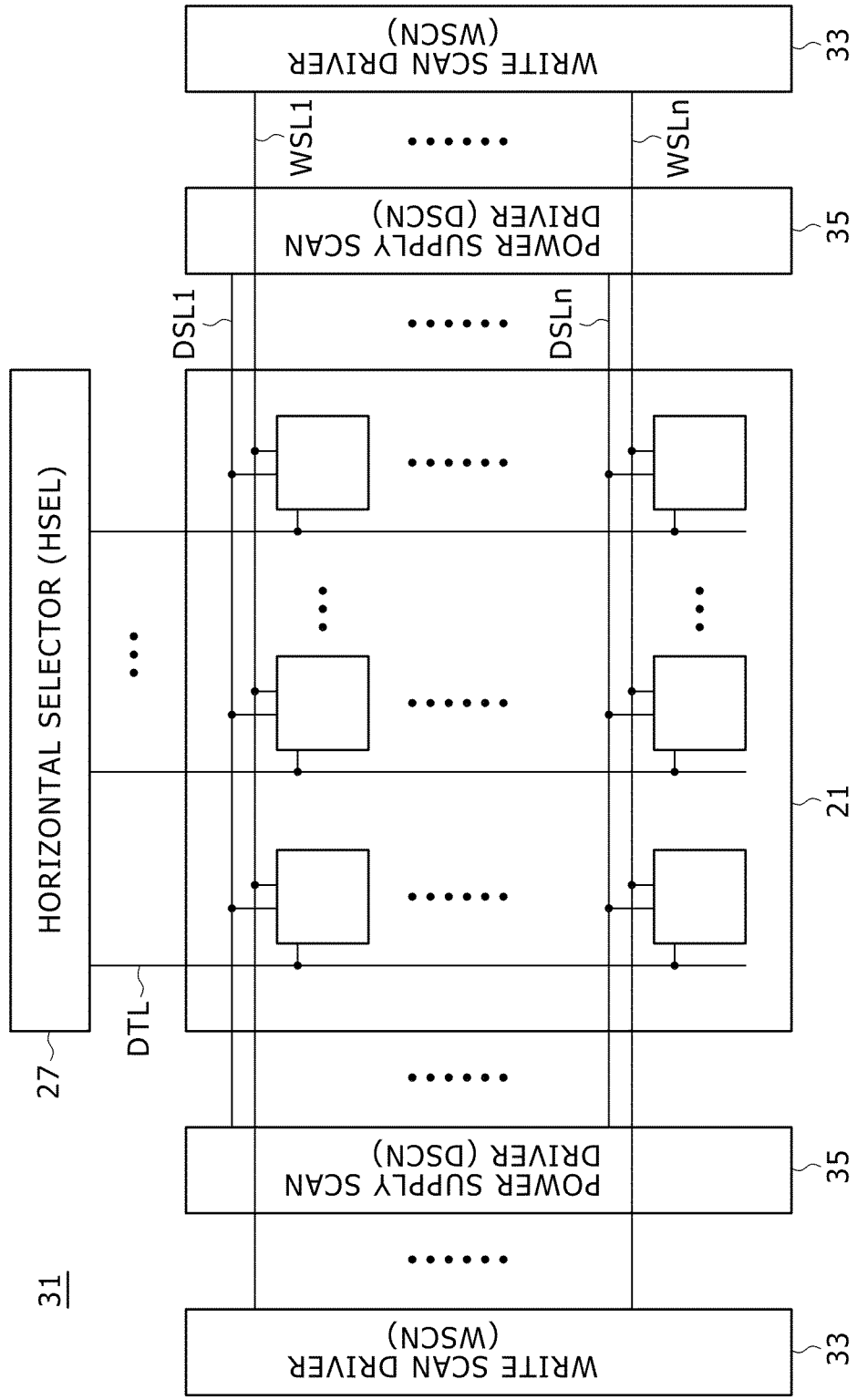
FIG. 19 is a block diagram showing an example of a system configuration of an organic EL panel module according to an embodiment 2 of the present invention.

FIG. 19 shows a general system configuration of an organic EL panel module 31 according to an embodiment 2 of the present invention.

Referring to FIG. 19, the organic EL panel module 31 shown includes a pixel array section 21, and a pair of write scan drivers 33, a pair of power supply scan drivers 35 and a horizontal selector 37 which are driving circuits for the pixel array section 21.

C-2. Basic Driving Operation

FIGS. 20A to 20E illustrate an example of driving operation used in the present embodiment. It is to be noted that, in the driving operation example of FIGS. 20A to 20E, threshold value correction operation is carried out commonly for two pixels positioned adjacent each other in the vertical direction, that is, threshold value correction operation for two adjacent horizontal lines, is carried out. Incidentally, it is illustrated in FIGS. 20A to 20E that threshold value correction operation is carried out only once within two horizontal scanning periods.

As seen from FIGS. 20A to 20D, the potential relationship after a threshold value correction preparation period starts until a threshold value correction period ends is same between the Nth stage and the N+1th stage, and it can be recognized that the quite same driving operation is executed between the two horizontal lines. However, as seen from FIGS. 20B and 20D, as regards writing of the signal potential Vsig corresponding to a threshold value, Nth stage writing is executed first, and then N+1th stage writing is executed.

Figure 20:
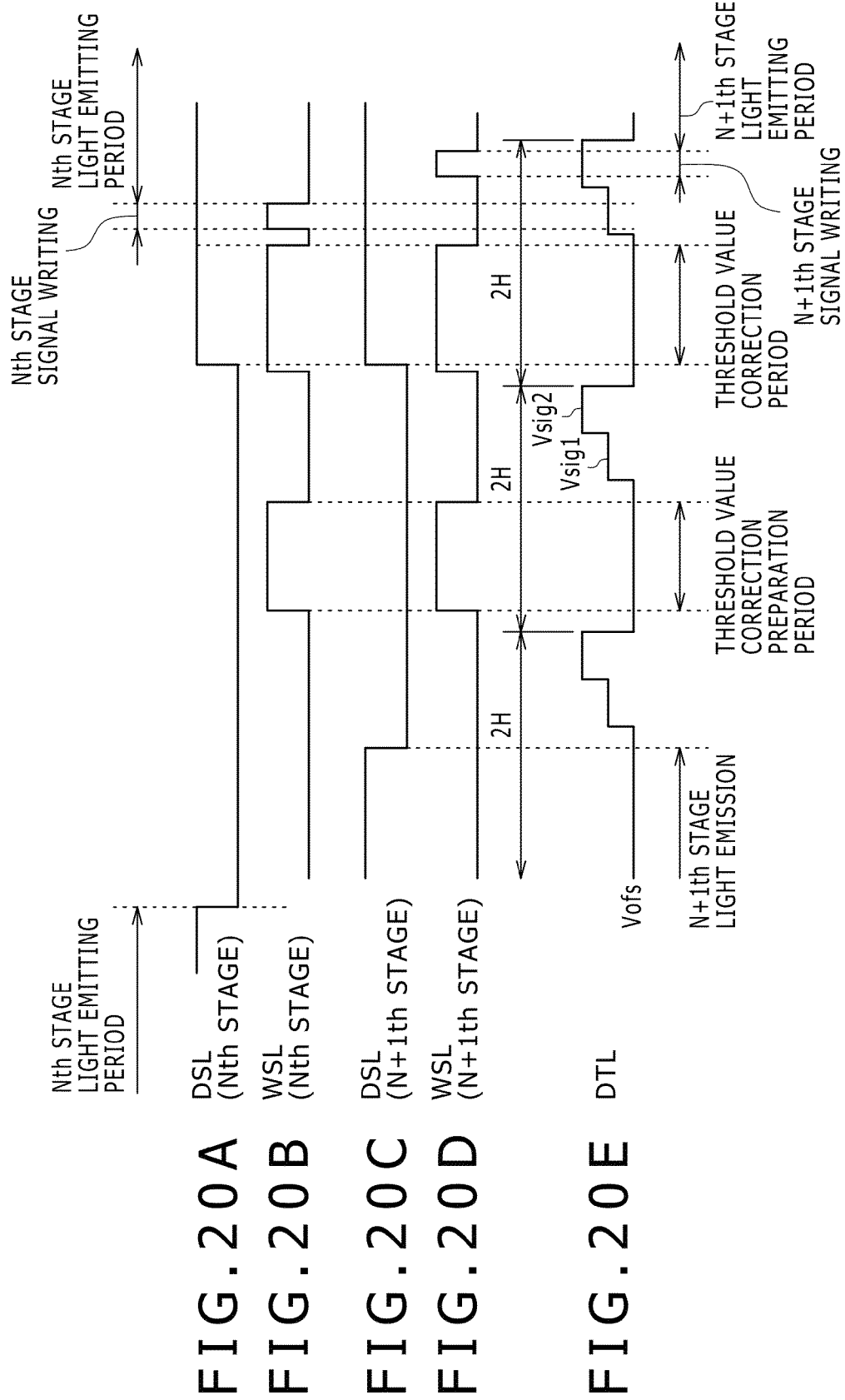
FIGS. 20A to 20E are timing charts illustrating an example of driving operation for a pixel circuit shown in FIG. 19.
Figure 21:
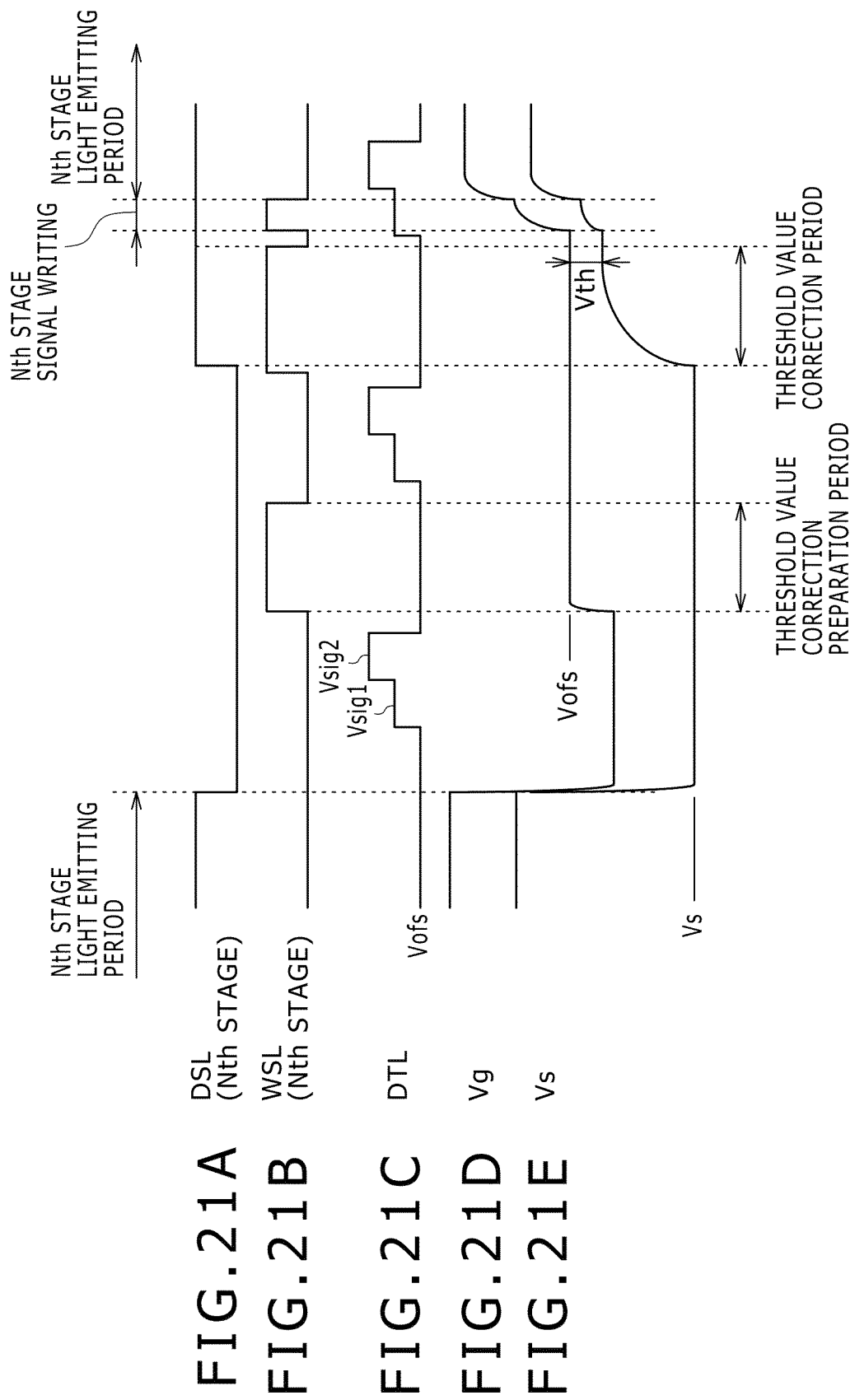
FIGS. 21A to 21E are diagrams illustrating an example of driving waveforms for pixel circuits corresponding to an Nth horizontal line in the organic EL panel module of FIG. 19.
Figure 22:
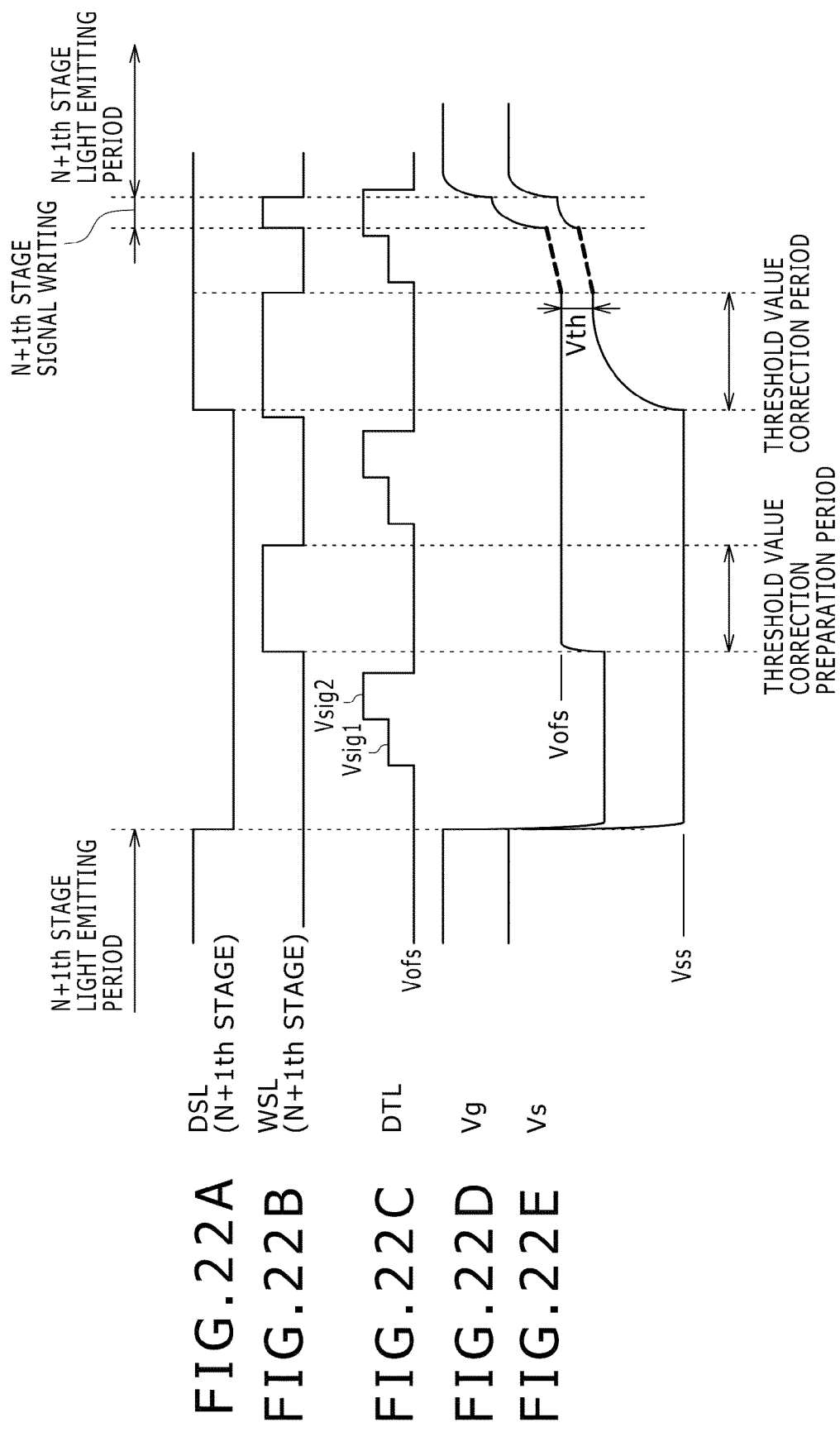
FIGS. 22A to 22E are diagrams illustrating an example of driving waveforms for pixel circuits corresponding to an N+1th horizontal line in the organic EL panel module of FIG. 19.

Incidentally, the advantage where such a driving method as described above is adopted resides in that the number of times of transition of the potential to be applied to the signal line DTL illustrated in FIG. 20E decreases and the actual time period which can be used for potential writing can be increased. For example, in the case of the embodiment 1, the number of times of transition of the signal potential within the two horizontal scanning periods is four including the offset potential Vofs→signal potential Vsig→offset potential Vofs→signal potential Vsig.

On the other hand, in the case of the embodiment 2, the number of times of transition of the signal potential within the two horizontal scanning periods is three including the offset potential Vofs→signal potential Vsig (Nth stage)→signal potential Vsig (N+1th stage). In other words, the number of times of transition of the potential of the signal line DTL in the case of the embodiment 2 is smaller by one. For this period length, a sufficient period can be applied to threshold value correction.

However, in the case of the present driving system, a difference in writing timing of the signal potential Vsig between the horizontal lines sometimes makes a cause of deterioration of the picture quality.

This is described in more detail with reference to FIGS. 21A to 21E and 22A to 22E. FIGS. 21A to 21E illustrate an example of driving waveforms used for driving pixel circuits corresponding to the Nth (N is an odd number) horizontal line. Meanwhile, FIGS. 22A to 22E illustrate an example of driving waveforms used for driving of pixel circuits corresponding to the N+1th horizontal line.

As seen in FIGS. 22A to 22E, the gate potential Vg and the source potential Vs of the driving transistor T2 are varied by leak current of the driving transistor T2, leak current of the organic EL element OLED, leak current of the scan transistor T1 and so forth within a period of waiting time before writing of the signal potential Vsig is started. A manner of such variation is indicated by a thick broken line.

In particular, the source potential Vs of the driving transistor T2 is influenced by the leak current of the driving transistor T2 so as to be shifted in a direction toward the potential of the feed line DSL, that is, toward the high potential Vcc, but is influenced by the leak current of the organic EL element OLED so as to be shifted in another direction toward the cathode potential Vcath.

Here, if it is assumed that the source potential Vs of the driving transistor T2 at the end of the threshold voltage correction is equal to or lower than the cathode potential Vcath, then the source potential Vs of the driving transistor T2 rises before writing of the signal potential Vsig is started. By a bootstrap operation by the rise of the source potential Vs, also the gate potential Vg rises.

The rise of the voltage occurs in proportion to the time length before writing. Particularly where the leak current of the driving transistor T2 is greater than the other leak current, the rise difference between the gate potential Vg and the source potential Vs becomes a level which cannot be ignored between two pixels for which the threshold value correction operation is carried out commonly. As a result, the dynamic range of the horizontal line of the N+1th stage becomes smaller than a desired dynamic range.

Figure 23:
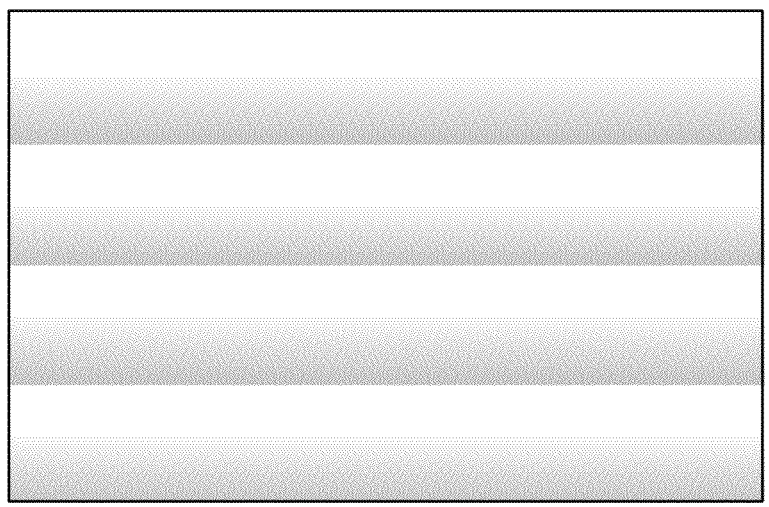
FIG. 23 is a schematic view showing a screen image on which image unevenness appears.

This signifies that a luminance difference appears also where the same gradation value is written into pixels of two horizontal lines positioned adjacent each other in the vertical direction. Accordingly, even where a screen image which is uniform over an overall area thereof is displayed, periodic irregularity or shading appears as seen in FIG. 23.

C-3. Example of Improvement in Driving Operation

Figure 24:
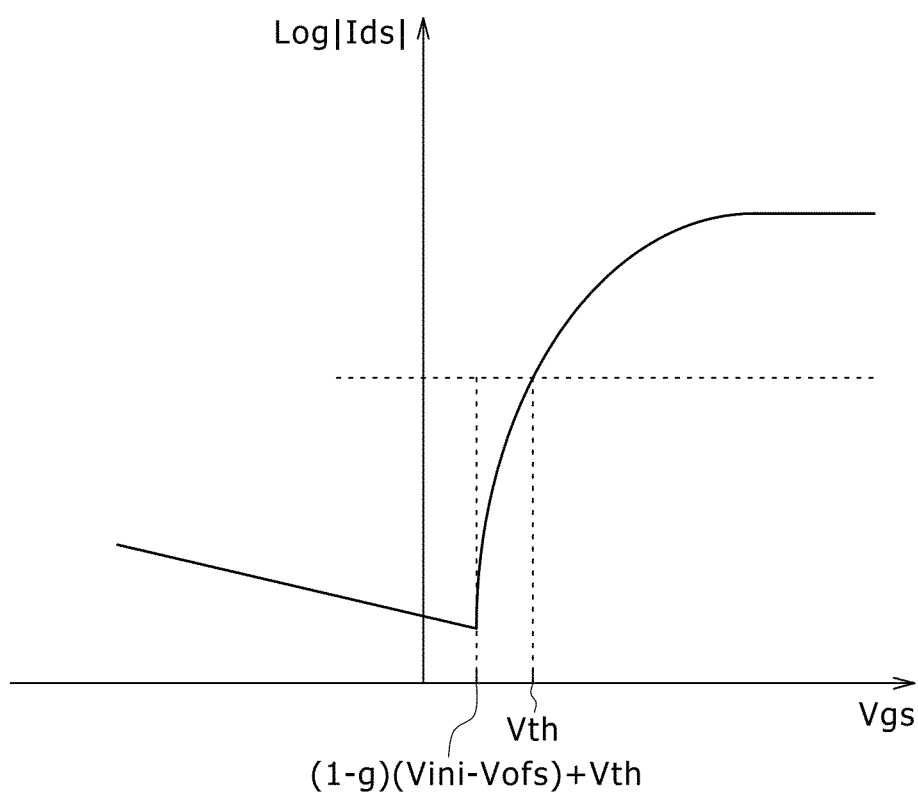
FIG. 24 is a diagram illustrating a Vg-Id characteristic of a thin film transistor.

FIG. 24 illustrates a general Vg-Id characteristic of the driving transistor T2. Referring to FIG. 24, even if the gate-source voltage Vgs of the driving transistor T2 is equal to the threshold voltage Vth, current Ids of a fixed value actually flows because of parasitic capacitance and so forth. In FIG. 24, the gate-source voltage Vgs of the driving transistor T2 is represented by Ct2.

Therefore, if the time after a threshold value correction operation ends until writing is carried out differs, then the difference in the rise amount of the source potential Vs of the driving transistor T2 becomes conspicuous because of an influence of the leak current. Particularly where the parasitic capacitance Cel of the organic EL element OLED and so forth are small, the influence of the leak current becomes conspicuous.

Therefore, the inventors of the present invention propose a driving method wherein a reset potential Vini lower than the offset potential Vofs is applied to two pixel circuits positioned adjacent each other in the vertical direction immediately before first writing of the signal potential Vsig is started after a threshold value correction operation is completed.

Figure 25:
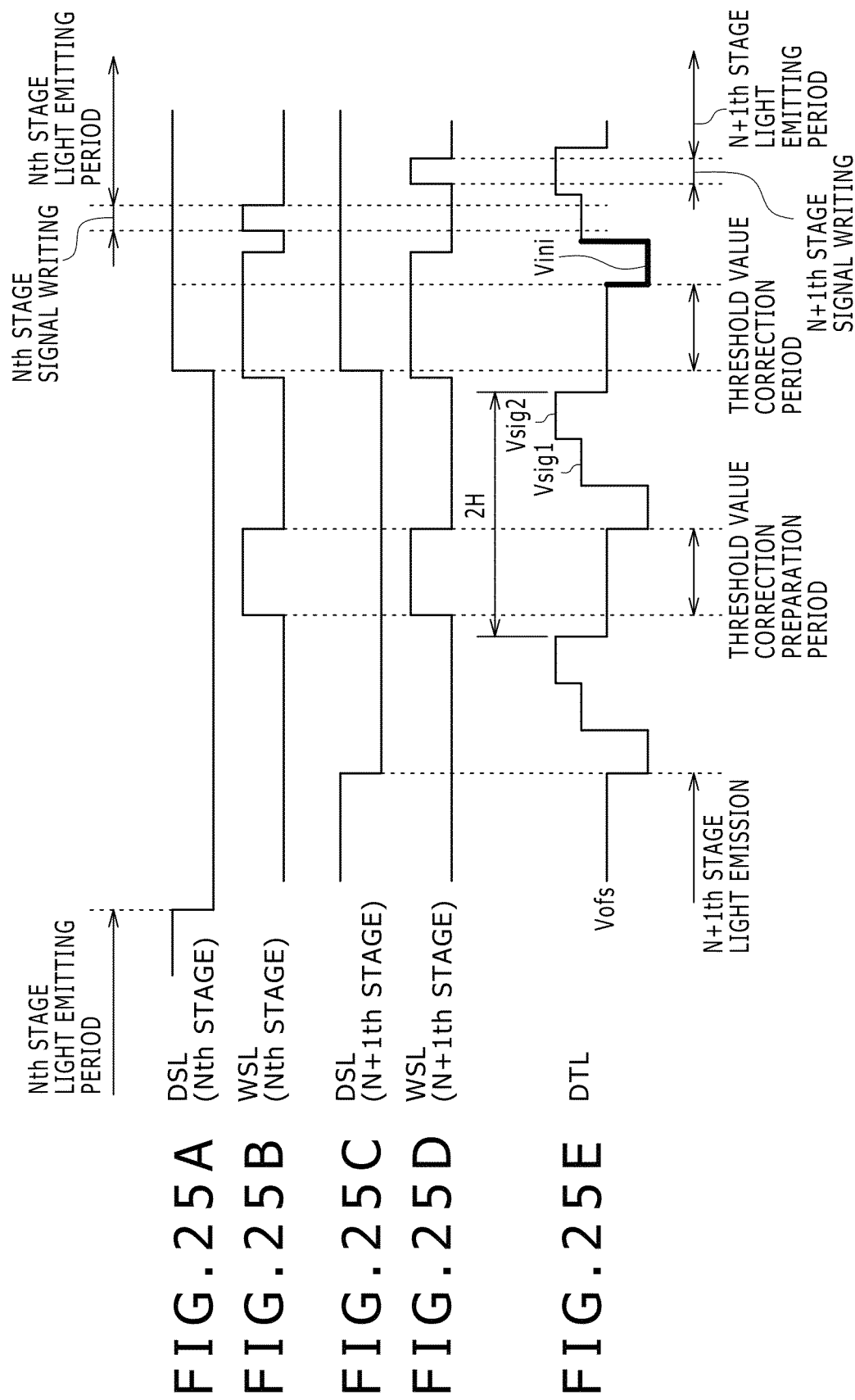
FIGS. 25A to 25E are timing charts illustrating another example of driving operation for a pixel circuit shown in FIG. 19.
Figure 26:
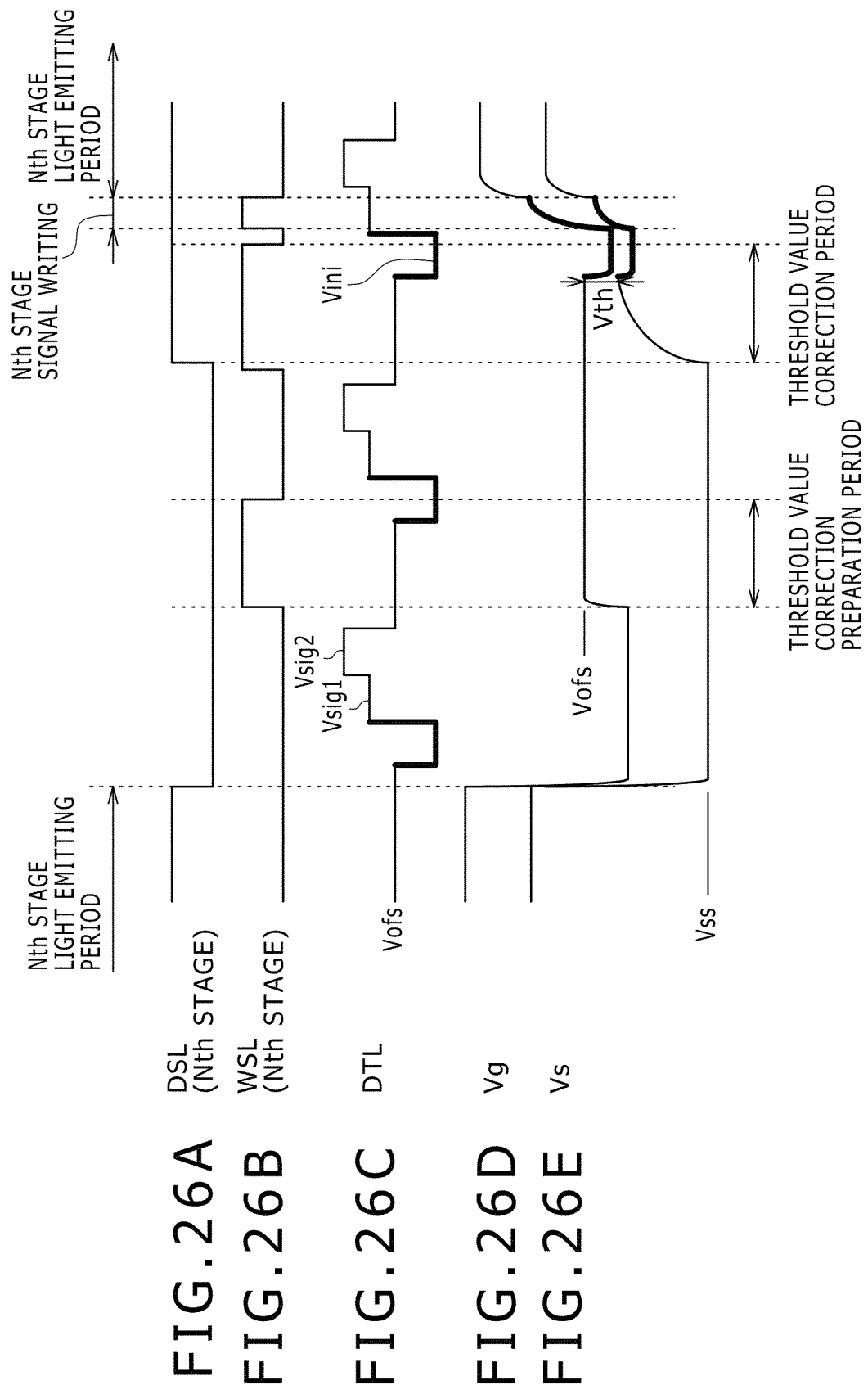
FIGS. 26A to 26E are diagrams illustrating another example of driving waveforms for pixel circuits corresponding to an Nth horizontal line in the organic EL panel module of FIG. 19.
Figure 27:
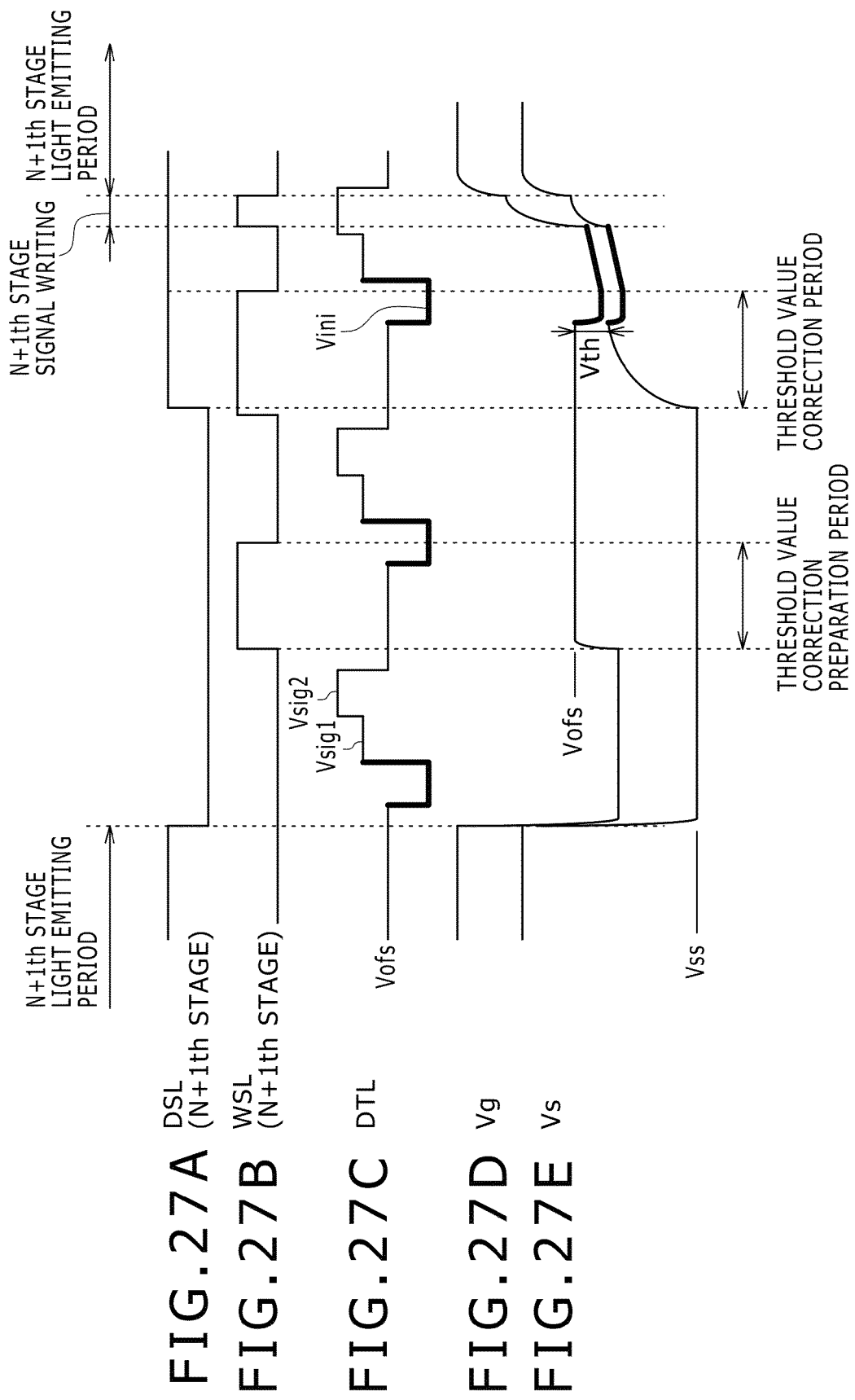
FIGS. 27A to 27E are diagrams illustrating another example of driving waveforms for pixel circuits corresponding to an N+1th horizontal line in the organic EL panel module of FIG. 19.

If the potential of the signal line DTL is changed from the offset potential Vofs to the reset potential Vini which is lower than the offset potential Vofs as indicated by a thick line in FIG. 25E before writing of the signal potential Vsig is started after a threshold value correction operation is completed, then the gate potential Vg of the driving transistor T2 of the pixel circuit corresponding to each of those pixels for which the threshold value correction operation is carried out commonly varies to the reset potential Vini.

In this instance, the source potential Vs of the driving transistor T2 becomes $(1-g) \cdot Vofs - Vth + g \times Vini$. Consequently, the gate-source voltage Vgs of the driving transistor T2 after the reset potential Vini is inputted becomes $(1-g) \cdot (Vini-Vofs) + Vth$. Here, since Vini<Vofs, the gate-source voltage Vgs at this time is lower than the threshold voltage Vth.

This signifies that the gate-source voltage Vgs of the driving transistor T2 can be adjusted with the value of the reset potential Vini. Accordingly, the leak current to flow through the driving transistor T2 can be adjusted to a minimum state as seen in FIG. 24.

As the leak current of the driving transistor T2 decreases, the rise amount of the source potential Vs of the driving transistor T2 can be reduced within a period before writing is started after the threshold value correction operation ends.

As a result, even if the period of time until writing of the signal potential Vsig is started after the threshold value correction operation is completed varies for every horizontal line, the rise difference of the gate-source voltage Vgs of the driving transistor T2 can be suppressed almost to an ignorable level. This signifies that such picture quality deterioration as irregularity or shading originating from leak current does not appear between horizontal lines.

For reference, driving waveforms for the Nth and N+1th stages are illustrated in FIGS. 26A to 26E and 27A to 27E, respectively. Here, FIGS. 26A to 26E illustrate an example of driving waveforms used for driving of pixel circuits corresponding to a horizontal line positioned at the Nth stage (N is an odd number). Meanwhile, FIGS. 27A to 27E illustrate an example of driving waveforms used for diving of pixel circuits corresponding to a horizontal line positioned at the N+1th stage.

As indicated by thick lines in FIGS. 26C to 26E and 27C to 27E, the variation of the gate potential Vg and the source potential Vs before writing of the signal potential Vsig is started after the threshold value correction operation is started is reduced significantly.

C-4. Summary

Where the driving system according to the present embodiment described above is adopted, even where the pixel resolution of the pixel array section 21 is raised and even where the driving speed of the pixel array section 21 is increased, the organic EL panel module does not suffer from deterioration of the picture quality originating from leak current.

Naturally, in the present embodiment, the driving method described above can be applied not only where a threshold value correction operation is carried out commonly for two horizontal lines positioned adjacent each other in the vertical direction but also where a threshold value correction operation is carried out commonly for three or more horizontal lines positioned adjacent each other in the vertical direction.

D. Embodiment 3

Here, an embodiment of the present invention wherein a threshold value correction operation is carried out commonly for a plurality of pixel circuits positioned within the same horizontal line and signal potentials are written into the pixel circuits time-sequentially using one signal line DTL.

a. System Example 1

Figure 28:
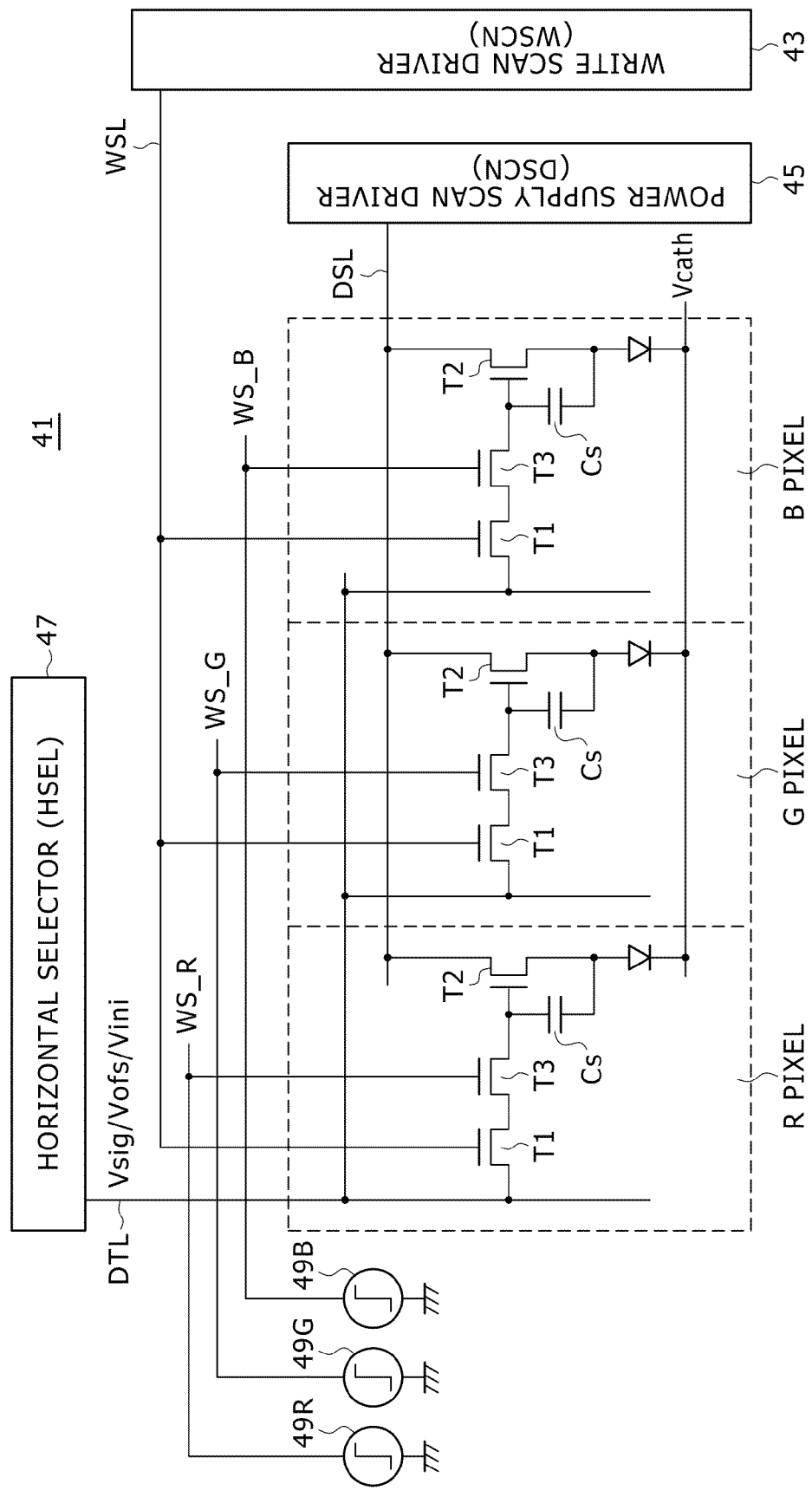
FIG. 28 is a block diagram showing a first example of a system configuration of an organic EL panel module according to an embodiment 3 of the present invention.

FIG. 28 shows a first example of a system configuration of an organic EL panel module 41 according to an embodiment 3. It is to be noted that, in the organic EL panel module 41 shown in FIG. 28, an R pixel, a G pixel and a B pixel on the same horizontal line are connected to one signal line DTL. In other words, in the first configuration example of FIG. 28, a common threshold value correction operation is applied to three sub pixels which compose one pixel and the signal potentials Vsig corresponding to the sub pixels are written time-sequentially into the sub pixels.

As driving circuits for the sub pixels, a write scan driver 43, a power supply scan driver 45 and a horizontal selector 47 are used similarly as in the other embodiments described hereinabove.

It is to be noted, however, that, in the system configuration shown in FIG. 28, a second scan transistor T3 is disposed in each pixel circuit for changing over the driving timing of the sub pixel.

The second scan transistor T3 is connected in series between one of main electrodes of the first scan transistor T1 and the gate electrode of the driving transistor T2 and is driven and controlled individually by a clock source 49R, 49G or 49B for exclusive use.

Figure 29:
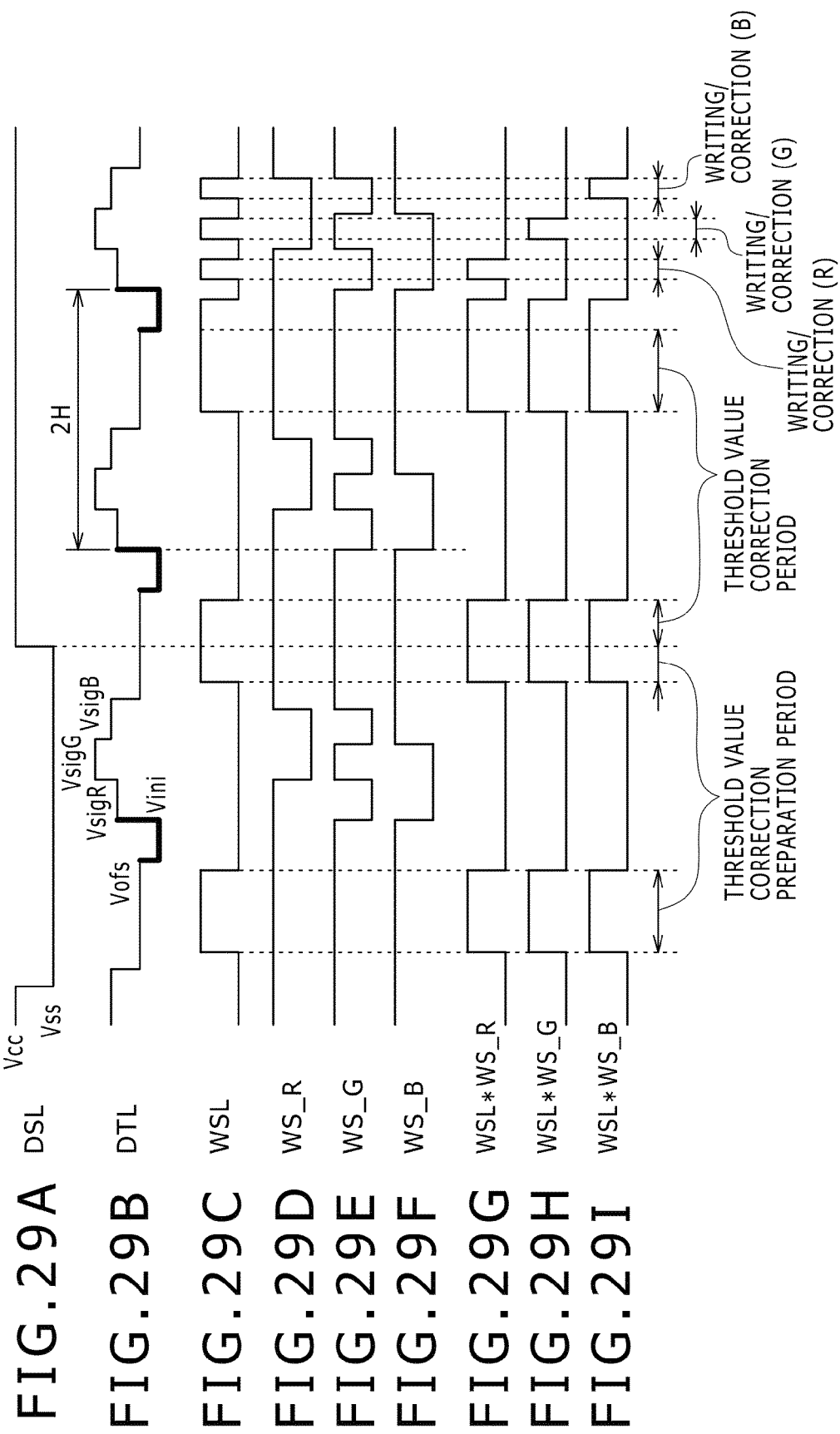
FIGS. 29A to 29I are timing charts illustrating an example of driving operation for a pixel circuit shown in FIG. 28.

FIGS. 29A to 29I illustrate an example of driving operation of the pixel circuits in the system configuration example of FIG. 28. In particular, FIG. 29A illustrates a potential waveform of the feed line DSL. FIG. 29B illustrates a potential waveform of the signal line DTL. Also in this instance, before the signal potential Vsig is written first after a threshold value correction operation ends, the potential of the signal line DTL is controlled to the reset potential Vini lower than the offset potential Vofs.

FIG. 29C illustrates a potential waveform of the first write scan line WSL. Also the potential waveform of the write scan line WSL is supplied to all sub pixels juxtaposed on one line similarly to the potential waveform of the feed line DSL.

FIGS. 29D to 29F illustrate potential waveforms of second write scan lines WS_R, WS_G and WS_B for dividing the signal potential Vsig for the individual sub pixels.

FIGS. 29G to 29I illustrate potential waveforms corresponding to logical AND values of the potential waveform of the first write scan line WSL and the potential waveforms of the second write scan lines WS_R, WS_G and WS_B and corresponding to the individual sub pixels, respectively. In particular, FIGS. 29G to 29I indicate timings at which the first and second scan transistors T1 and T3 operate into an on state simultaneously.

In other words, FIGS. 29G to 29I illustrate timings at which the potential of the signal line DTL is written into the storage capacitor Cs.

It is to be noted that FIG. 29G illustrates a timing waveform corresponding to the R pixel; FIG. 29H illustrates the timing waveform corresponding to the G pixel; and FIG. 29I illustrates the timing waveform corresponding to the B pixel.

Incidentally, in the case of the present system configuration example, the three clock sources 49R, 49G and 49B are newly required, and the three write scan lines WS_R, WS_G and WS_B are newly required for one horizontal line. However, increase of the cost for the clock sources is small in comparison with that for shift registers, and the system configuration example can be placed into practical use sufficiently.

b. System Example 2

Figure 30:
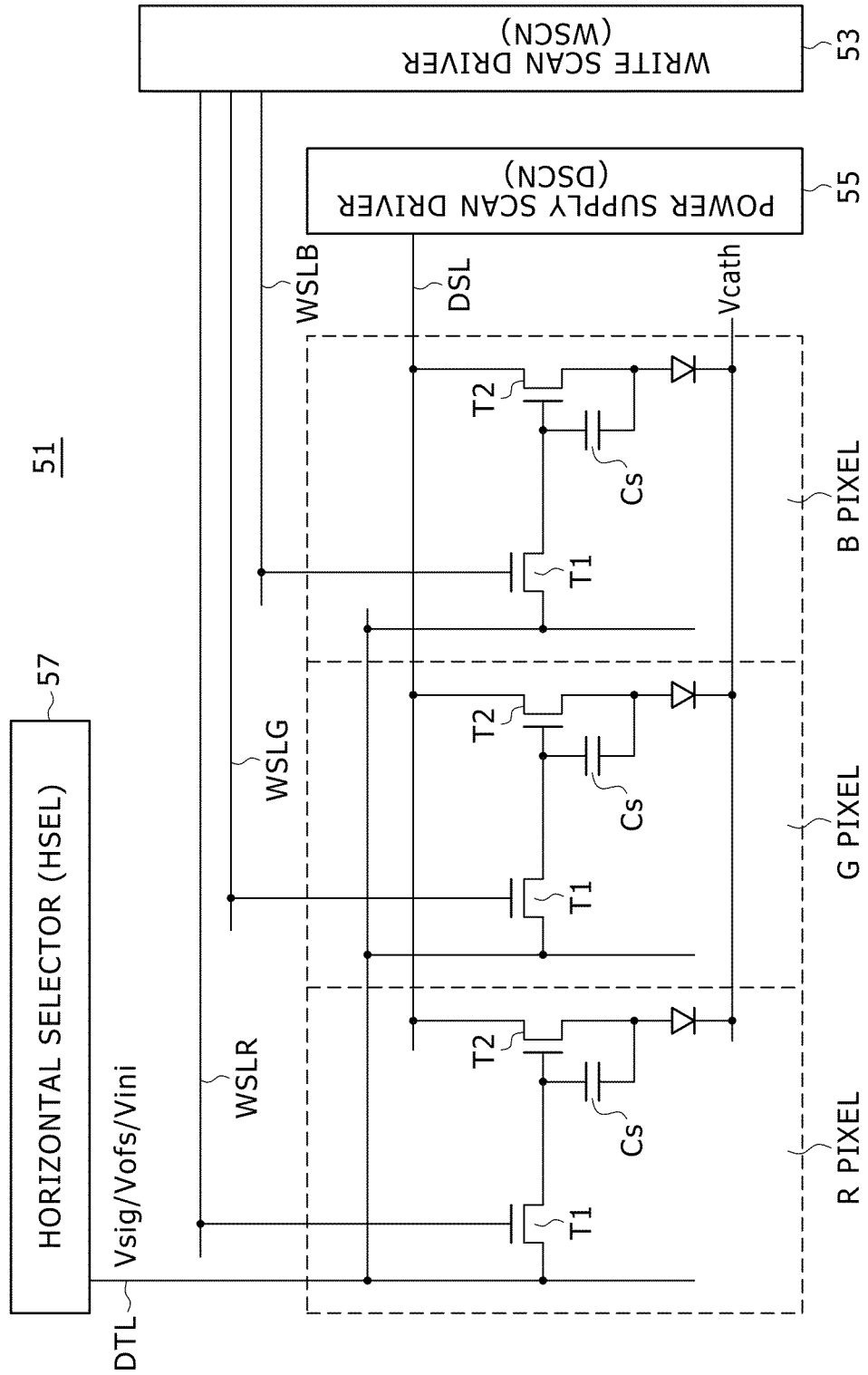
FIG. 30 is a block diagram showing a second example of the system configuration of the organic EL panel module according to the embodiment 3 of the present invention.

FIG. 30 shows a second example of a system configuration of an organic EL panel module 51 according to the embodiment 3. Referring to FIG. 30, also in the organic EL panel module 51 shown, an R pixel, a G pixel and a B pixel on the same horizontal line are connected to one signal line DTL.

However, the system example 2 is different from the system example 1 in that write scan lines WSLR, WSLG and WSLB for the different colors are prepared without using the clock sources.

The system configuration of FIG. 30 uses driving circuits for the sub pixels including a write scan driver 53, a power supply scan driver 55 and a horizontal selector 57.

In the present system example, also the configuration of a pixel circuit corresponding to each sub pixel may be same as that in the embodiment 1 or the embodiment 2.

Figure 31:
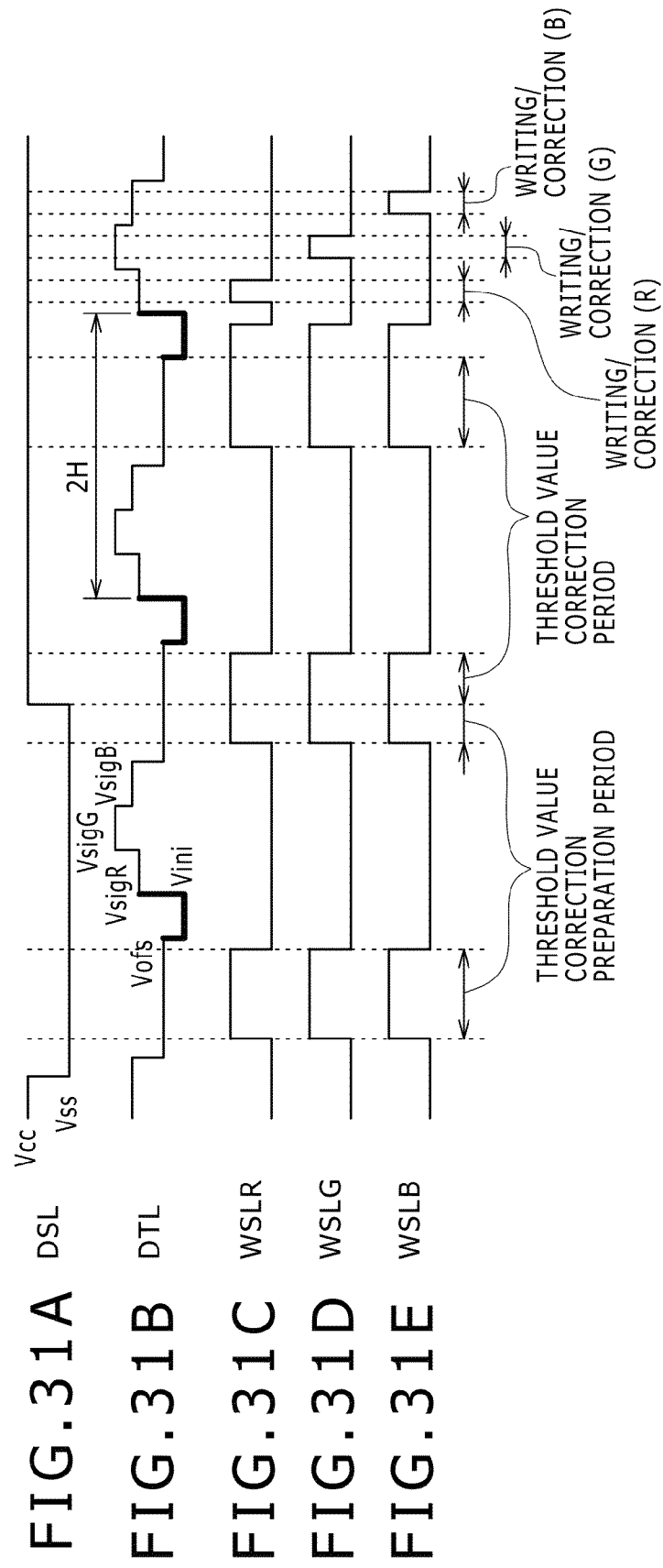
FIGS. 31A to 31E are timing charts illustrating an example of driving operation for a pixel circuit shown in FIG. 30.

FIGS. 31A to 31E illustrate an example of driving operation of pixel circuits of the present system example. In particular, FIG. 31A illustrates a potential waveform of a feed line DSL. FIG. 31B illustrates a potential waveform of a signal line DTL. Also in this instance, before first writing of the signal potential Vsig after a threshold value correction operation ends, the potential of the signal line DTL is controlled to the reset potential Vini lower than the offset potential Vofs.

FIGS. 31C to 31E illustrate potential waveforms of the write scan lines WSLR, WSLG and WSLB wired for the sub pixels for the individual colors. The waveforms of FIGS. 31C to 31E correspond to those of FIGS. 29G to 29I in the system example 1, respectively. Accordingly, also in the case of the present system example, driving operation same as that in the system example 1 is expected. It is to be noted, however, that, in the present system example, write scan drivers for exclusive use for the individual colors are required, and a number of write scan drivers greater by two in the system example 1 are required.

c. Others

While, in the present embodiment, a clock source or a write scan driver for exclusive use for each of the R pixel, G pixel and B pixel is prepared, the clock source or the write scan driver need not necessarily correspond to each of the colors. The point is that only it is necessary to prepare a clock source or sources or a line scan driver or drivers so that a driving timing can be divided in accordance with the number of sub pixels for which one signal line is used commonly.

E. Other Embodiments

E-1. Other Examples of a Pixel Circuit

In the foregoing description of the embodiments of the present invention, a pixel circuit is composed of two thin film transistors.

Figure 32:
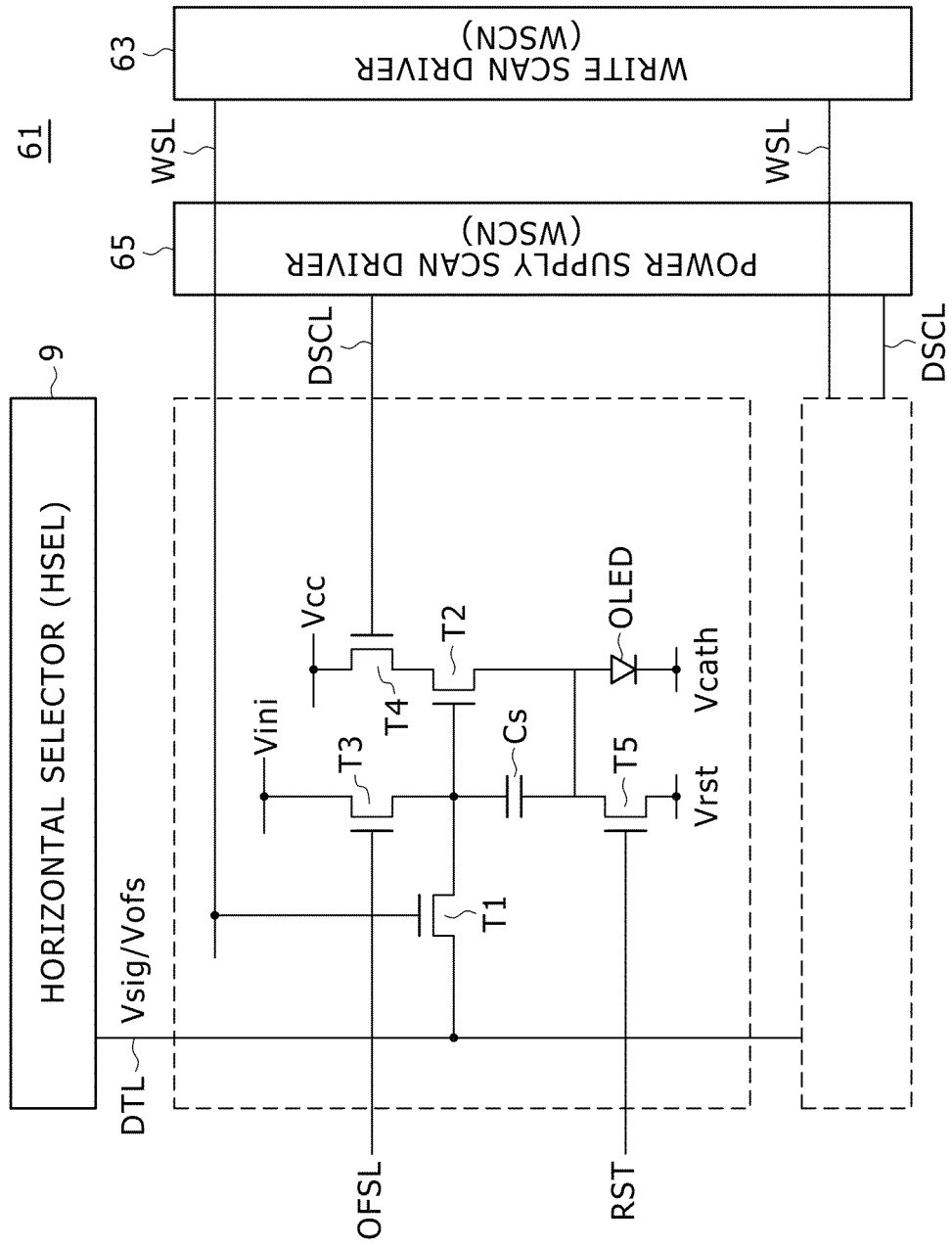
FIG. 32 is a block circuit diagram showing a different example of a pixel circuit.

However, some other circuit configuration may be adopted for a pixel circuit. FIG. 32 shows a pixel circuit composed of five thin film transistors.

Referring to FIG. 32, the pixel circuit shown includes, in addition to the scan transistor T1, driving transistor T2 and storage capacitor Cs described hereinabove, a scan transistor T3 for exclusive use for writing the reset potential Vini, a feed transistors T4 for exclusive use for applying the high potential Vcc, and a reset transistor T5 for exclusive use for applying a reset potential within a threshold value correction preparation period.

It is to be noted that the high potential Vcc in the pixel circuit shown in FIG. 32 is a fixed power supply.

Figure 33:
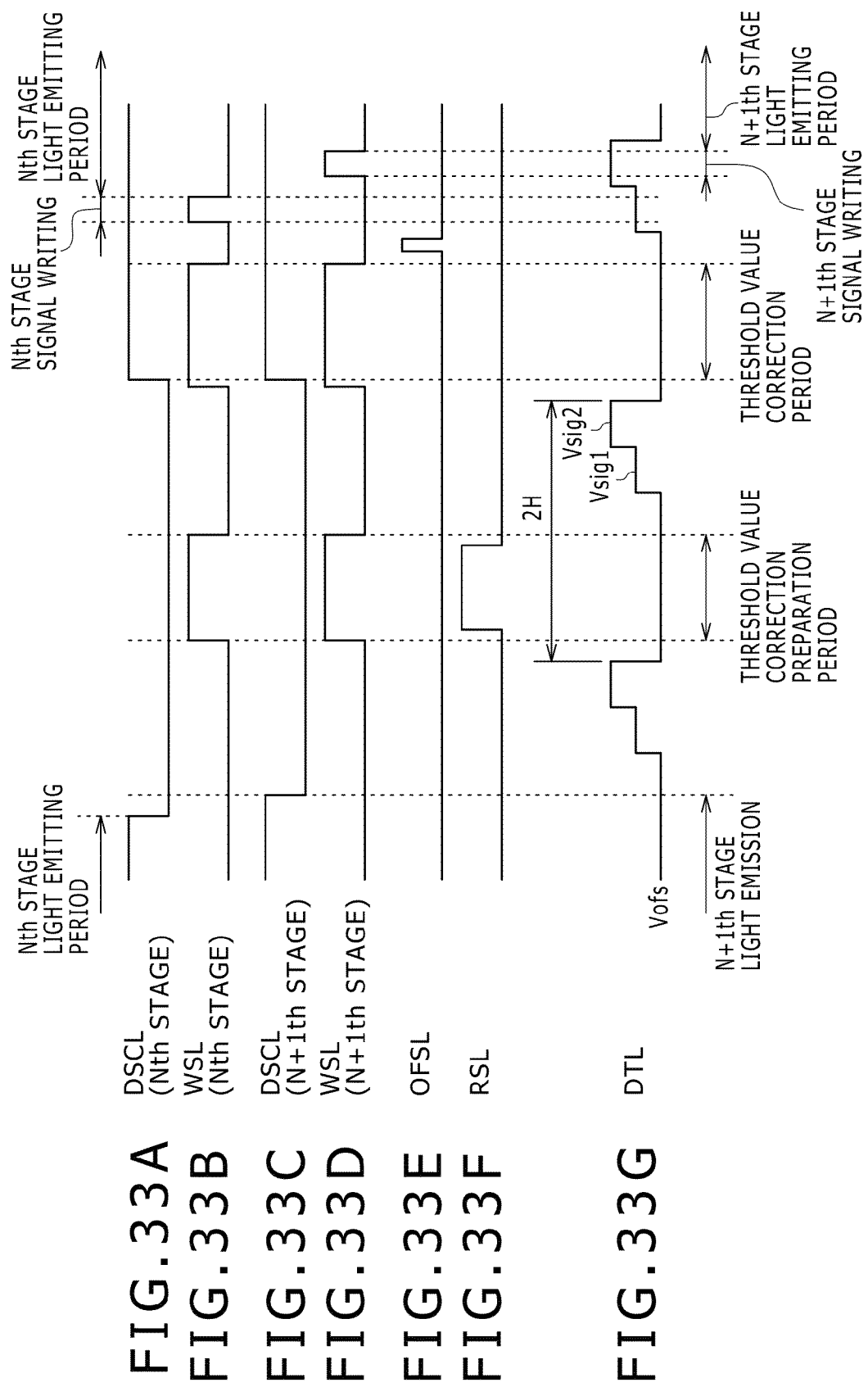
FIGS. 33A to 33G are timing charts illustrating an example of driving operation for the pixel circuit shown in FIG. 32.

FIGS. 33A to 33G illustrate an example of driving operation of the pixel circuit. In particular, FIG. 33A illustrates a potential waveform of a feed control scan line DSCL corresponding to a horizontal line positioned at the Nth stage (N is an odd number). FIG. 33B illustrates a potential waveform of the write scan line WSL corresponding to the horizontal line positioned at the Nth stage (N is an odd number).

Meanwhile, FIG. 33D illustrates a potential waveform of the write scan line WSL corresponding to a horizontal line positioned at the N+1th stage. FIG. 33C illustrates a potential waveform of the feed control scan line DSCL corresponding to the horizontal line positioned at the N+1th stage.

FIG. 33E illustrates a potential waveform of an offset signal line OFSL. FIG. 33F illustrates a potential waveform of a reset signal line RSL. FIG. 33G illustrates a potential waveform of a signal line DTL which is common to two pixels. Also in this instance, before first writing of the signal potential Vsig after a threshold value correction operation ends, the potential of the signal line DTL is controlled to the reset potential Vini lower than the offset potential Vofs.

E-2. Examples of a Product a. Electronic Apparatus

In the embodiments described above, the present invention is applied to an organic EL panel module. However, the organic EL panel module is distributed also in the form of a commodity wherein it is incorporated in various electronic apparatus. In the following, various examples wherein the organic EL panel module is incorporated in other electronic apparatus are described.

Figure 34:
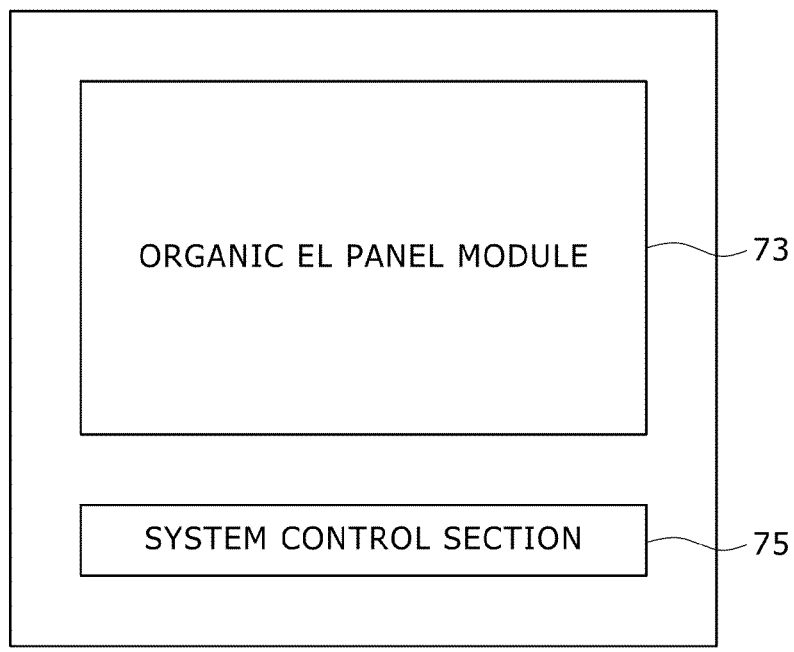
FIG. 34 is a schematic view showing an example of an electronic apparatus.

FIG. 34 shows an example of a configuration of an electronic apparatus 71. Referring to FIG. 34, the electronic apparatus 71 includes an organic EL panel module 73 described hereinabove and a system control section 75. The contents of processing executed by the system control section 75 differ depending upon the form of a commodity of the electronic apparatus 71.

It is to be noted that the electronic apparatus 71 is not limited to an apparatus in a particular field only if it incorporates a function of displaying an image produced in the apparatus or inputted from the outside.

Figure 35:
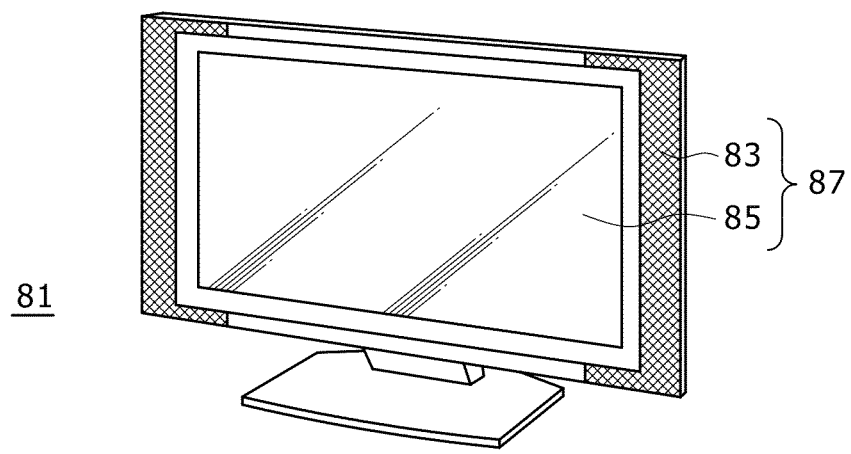
FIGS. 35, 36A and 36B, 37, 38A and 38B, and 39 are schematic views showing different examples of the electronic apparatus of FIG. 34 as a commodity.

FIG. 35 shows an example of an appearance of an electronic apparatus in the form a television receiver. Referring to FIG. 35, the television receiver 81 includes a display screen 87 provided on the front face of a housing thereof and including a front panel 83, a filter glass plate 85 and so forth. The display screen 87 corresponds to the organic EL panel module of any of the embodiments described hereinabove.

Figure 36A:
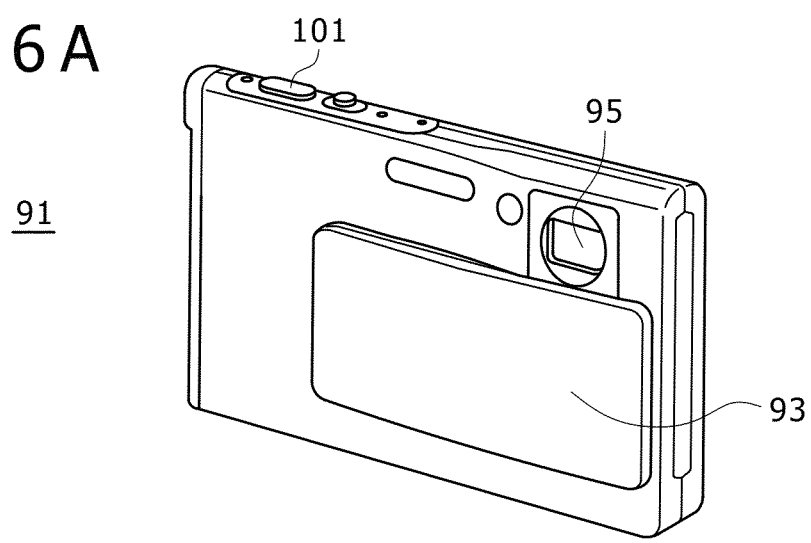
Figure 36B:
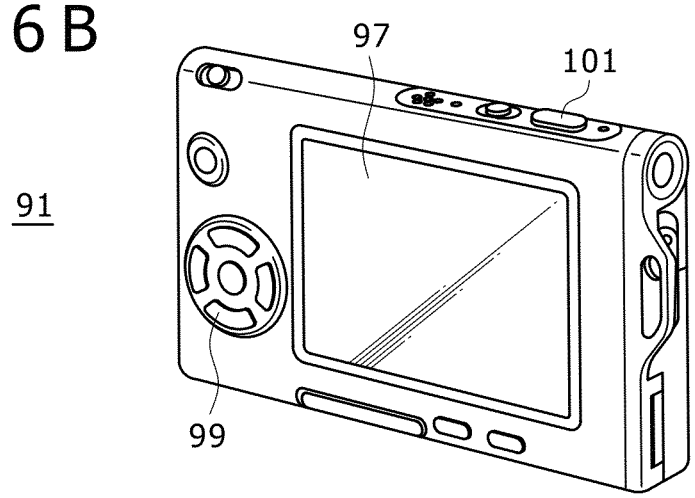

The electronic apparatus 71 may alternatively have a form of, for example, a digital camera. FIGS. 36A and 36B show an example of an appearance of a digital camera 91. In particular, FIG. 36A shows an example of an appearance of the front face side, that is, the image pickup object side, and FIG. 36B shows an example of an appearance of the rear face side, that is, the image pickup person side, of the digital camera 91.

Referring to FIGS. 36A and 36B, the digital camera 91 shown includes a protective cover 93, an image pickup lens section 95, a display screen 97, a control switch 99 and a shutter button 101. The display screen 97 corresponds to the organic EL panel module of any of the embodiments described hereinabove.

Figure 37:
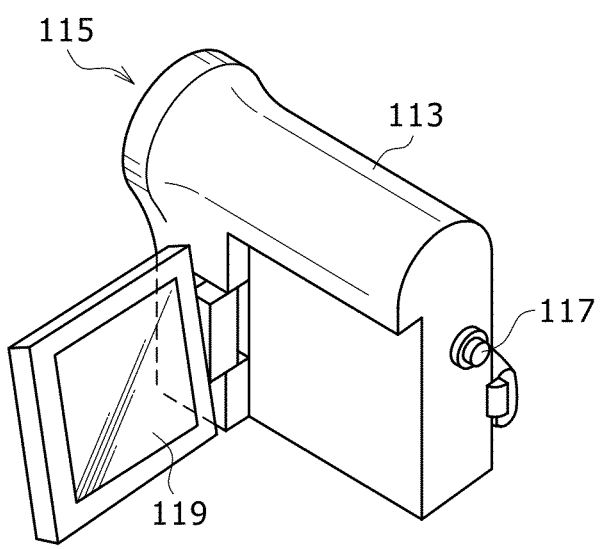

The electronic apparatus 71 may otherwise have a form of, for example, a video camera. FIG. 37 shows an example of an appearance of a video camera 111.

Referring to FIG. 37, the video camera 111 shown includes a body 113, and an image pickup lens 115 for picking up an image of an image pickup object, a start/stop switch 117 for image pickup and a display screen 119, provided at a front portion of the body 113. The display screen 119 corresponds to the organic EL panel module of any of the embodiments described hereinabove.

Figure 38A:
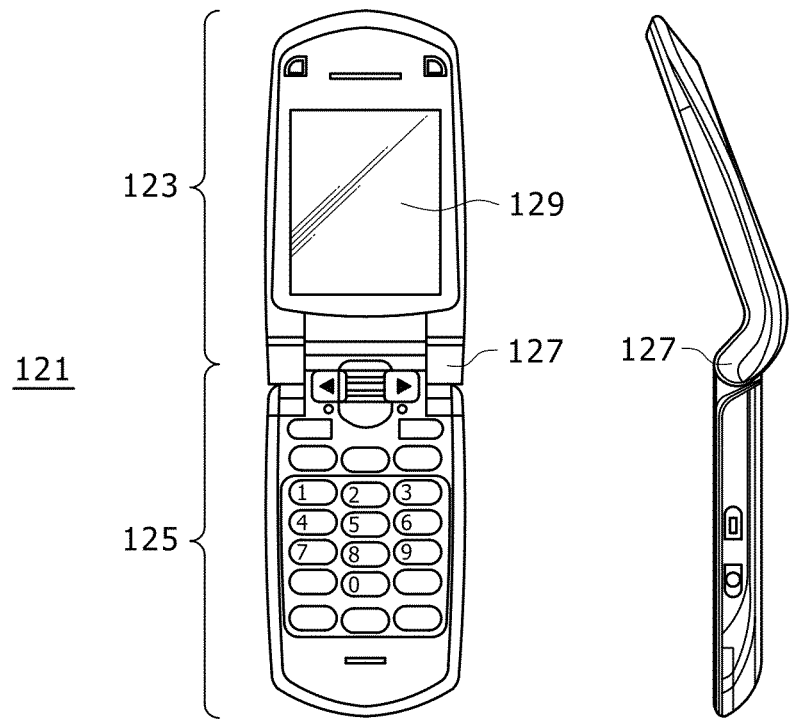
Figure 38B:
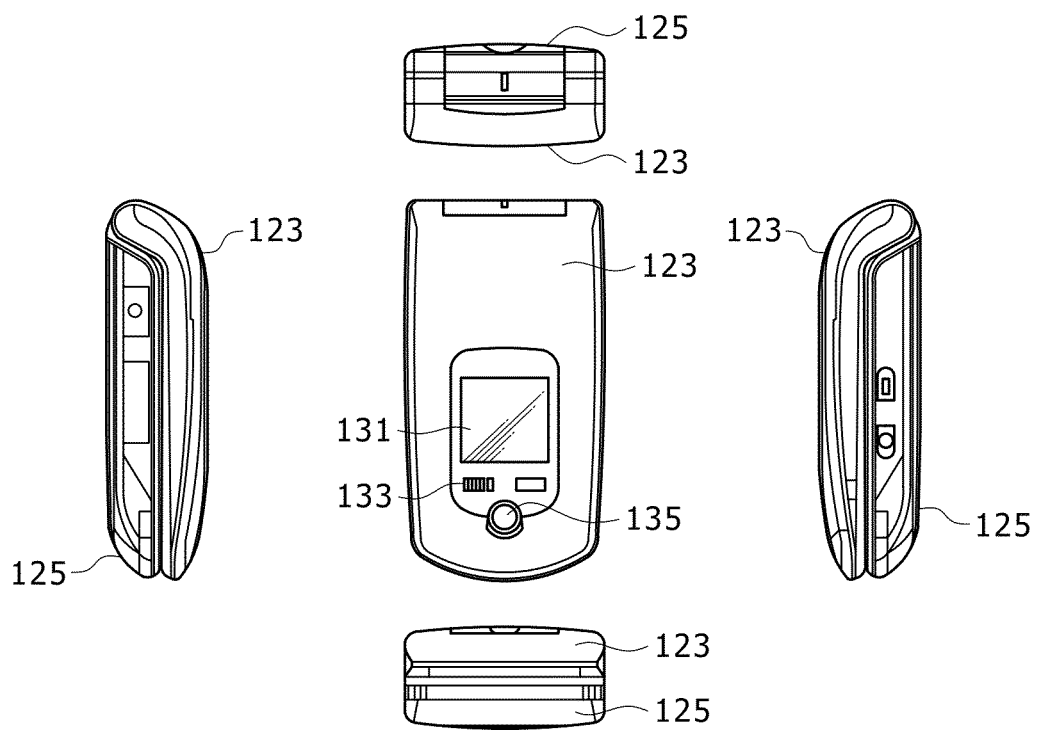

The electronic apparatus 71 may alternatively have a form of, for example, a portable terminal apparatus. FIGS. 38A and 38B show an example of an appearance of a portable telephone set 121 as a portable terminal apparatus. Referring to FIGS. 38A and 38B, the portable telephone set 121 shown is of the foldable type, and FIG. 38A shows an example of an appearance of the portable telephone set 121 in a state wherein a housing thereof is unfolded while FIG. 38B shows an example of an appearance of the portable telephone set 121 in another state wherein the housing thereof is folded.

The portable telephone set 121 includes an upper side housing 123, a lower side housing 125, a connection section 127 in the form of a hinge section, a display screen 129, a sub display screen 131, a picture light 133 and an image pickup lens 135. The display screen 129 and the sub display screen 131 correspond to the organic EL panel module of any of the embodiments described hereinabove.

Figure 39:
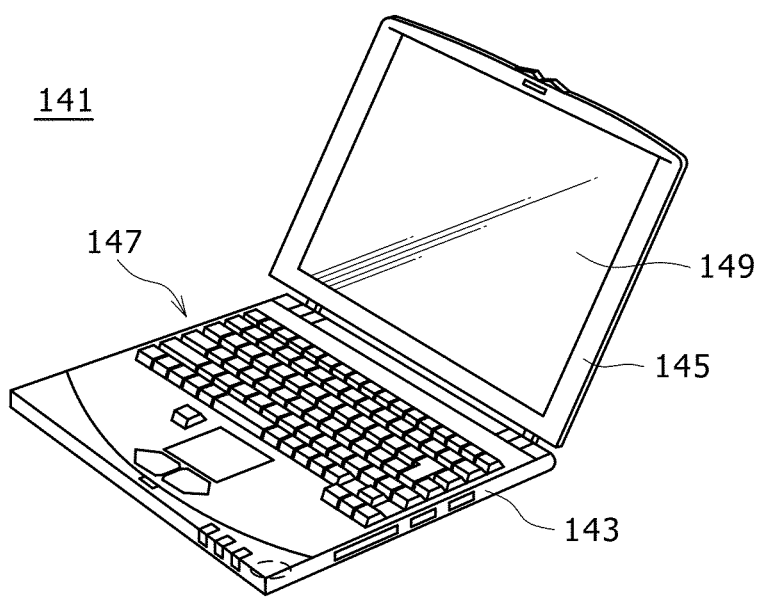

The electronic apparatus 71 may otherwise have a form of, for example, a computer. FIG. 39 shows an example of an appearance of a notebook type computer 141.

Referring to FIG. 39, the notebook type computer 141 shown includes a lower side housing 143, an upper side housing 145, a keyboard 147 and a display screen 149. The display screen 149 corresponds to the organic EL panel module of any of the embodiments described hereinabove.

The electronic apparatus 71 may otherwise have various other forms such as an audio reproduction apparatus, a game machine, an electronic book and an electronic dictionary.

E-3. Other Examples of a Display Device

In the foregoing description, the present invention is applied to an organic EL panel module.

However, the driving technique described above can be applied also to EL display apparatus of other types. For example, the present invention can be applied also, for example, to a display apparatus wherein a plurality of LEDs (light emitting diodes) are arrayed and another display apparatus wherein a plurality of light emitting elements having some other diode structure are arrayed on a screen.

E-4. Others

The embodiments described above may be modified in various manners without departing from the spirit and scope of the present invention. Also various modifications and applications may be created or combined based on the disclosure of the present invention.

What is claimed is:

1. An electro luminescence display device having a pixel array section,
    the pixel array section comprising a driving circuit and a plurality of pixels disposed in a matrix,
    wherein the driving circuit is configured to drive the plurality of pixels such that:
    a reset potential lower than a reference potential is supplied to each pixel of a group simultaneously before any corresponding signal potential is written into a pixel of the group for a given frame, the group comprising more than one pixels that are connected to a same signal line,
    a threshold value correction operation is carried out simultaneously for each pixel of the group, where the threshold value correction operation includes supplying the reference potential to the respective pixels for which the threshold value correction operation is performed, and
    a corresponding signal potential is sequentially written into each pixel of the group through the same signal line after the threshold value correction operation has been completed for the given frame period, where the corresponding signal potential written into each pixel corresponds to a gradation value for that respective pixel for the given frame period.

2. The electro luminescence display device according to claim 1, wherein the group includes pixels that are positioned on different horizontal lines.

3. The electro luminescence display device according to claim 1, wherein the group includes pixels that are positioned on the same horizontal line.

4. The electro luminescence display device according to claim 1, wherein the group comprises a red pixel, a green pixel, and a blue pixel.

5. The electro luminescence display device according to claim 4, wherein each pixel of the group is configured to be controlled by a same write scan line.

6. The electro luminescence display device according to claim 1, wherein the reset potential is applied to the each pixel of the group through the same signal line and through the write transistor of the respective pixel.

7. The electro luminescence display device according to claim 1, wherein the pixel array section further comprises a plurality of power supply lines that supply current to the plurality of pixels;

a high potential is supplied on the plurality of power supply lines; and the driving circuit is further configured to apply a threshold preparation potential lower than the high potential to each pixel of the group prior to carrying out the threshold value correction operation.

8. The electro luminescence display device according to claim 7, wherein the threshold preparation potential is applied through the plurality of power supply lines.

9. A driving method for a pixel array section of an electro luminescence display device, the pixel array section comprising a plurality of pixels disposed in a matrix, and the driving method comprising:

supplying a reset potential lower than a reference potential to each pixel of a group simultaneously before any corresponding signal potential is written into a pixel of the group for a given frame, the group comprising more than one pixels that are connected to a same signal line, simultaneously executing a threshold value correction operation for each pixel of the group, where the threshold value correction operation includes supplying the reference potential to the respective pixels for which the threshold value correction operation is performed, and writing a corresponding signal potential into each pixel of the group through the same signal line after the threshold value correction operation has been completed for the given frame period, where the corresponding signal potential written into each pixel corresponds to a gradation value for that respective pixel for the given frame period.

* * * * *